(12) United States Patent
Kawai

(10) Patent No.: US 7,499,639 B2
(45) Date of Patent: Mar. 3, 2009

(54) ELECTRONIC IMAGING DEVICE

(75) Inventor: Sumio Kawai, Hachioji (JP)

(73) Assignee: Olympus Corporation, Tokyo (JP)

( * ) Notice: Subject to any disclaimer, the term of this patent is extended or adjusted under 35 U.S.C. 154(b) by 504 days.

(21) Appl. No.: 11/214,273

(22) Filed: Aug. 29, 2005

(65) Prior Publication Data

US 2006/0062568 A1     Mar. 23, 2006

(30) Foreign Application Priority Data

Sep. 22, 2004   (JP) ............................. 2004-276053

(51) Int. Cl.
   *G02B 7/28* (2006.01)
(52) U.S. Cl. .................. 396/111; 396/147; 396/281; 396/439; 396/619; 359/507; 348/818
(58) Field of Classification Search ............... 348/61, 348/818; 359/507; 396/111, 132, 147, 281, 396/439, 619
   See application file for complete search history.

(56) References Cited

U.S. PATENT DOCUMENTS

| | | | | |
|---|---|---|---|---|
| 2003/0214599 | A1* | 11/2003 | Ito et al. | ...................... 348/335 |
| 2004/0047625 | A1 | 3/2004 | Ito et al. | |
| 2004/0263669 | A1* | 12/2004 | Kobayashi | ................... 348/340 |

FOREIGN PATENT DOCUMENTS

| JP | 57-078032 | 5/1982 |
|---|---|---|
| JP | 62-165127 | 7/1987 |
| JP | 01-230016 | 9/1989 |
| JP | 03-244281 | 10/1991 |
| JP | 05-213286 | 8/1993 |
| JP | 07-151946 | 6/1995 |
| JP | 07-322153 | 12/1995 |
| JP | 08-079633 | 3/1996 |
| JP | 09-130654 | 5/1997 |
| JP | 2000-029132 | 1/2000 |
| JP | 2000-330054 | 11/2000 |
| JP | 2001-298640 | 10/2001 |
| JP | 2001-359287 | 12/2001 |
| JP | 2002-229110 | 8/2002 |
| JP | 2004-032191 | 1/2004 |

* cited by examiner

*Primary Examiner*—Melissa J Koval
*Assistant Examiner*—Michael A Strieb
(74) *Attorney, Agent, or Firm*—Straub and Pokotylo; John C. Pokotylo

(57) ABSTRACT

There is disclosed an electronic imaging device having an imaging element, a mechanism which removes dust attached to the imaging element or an optical element disposed in front of the imaging element, and a display section which displays that at least the mechanism is operating. Consequently, an operator of the electronic imaging device can exactly recognize whether or not the mechanism to remove the dust is operating. Examples of the mechanism which removes the dust include an excitation mechanism which vibrates a dust-proof filter disposed in front of the imaging element, a mechanism which removes the dust by a gas flow and the like.

17 Claims, 15 Drawing Sheets

ELECTRONIC IMAGING DEVICE

CROSS-REFERENCE TO RELATED APPLICATION

This application is based upon and claims the benefit of priority from prior Japanese Patent Application No. 2004-276053, filed Sep. 22, 2004, the entire contents of which is incorporated herein by reference.

BACKGROUND OF THE INVENTION

1. Field of the Invention

The present invention relates to an electronic imaging device provided with an imaging element for outputting an image signal corresponding to light irradiating a photoelectric conversion surface. Examples of this electronic imaging device include a lens-interchangeable single lens reflex digital camera.

2. Description of the Related Art

In recent years, there has been generally put to practical use a so-called "lens-interchangeable" type of digital camera constituted in such a manner that a plurality of types of imaging optical systems are selectively usable in a single camera main body. For example, the single lens reflex type of digital camera has a finder unit, and the imaging optical system is detachably attached to a camera main body. Therefore, a user can selectively use the imaging optical system as desired.

In this lens-interchangeable digital camera, when the imaging optical system is detached from the camera main body, dirt sometimes enters the camera main body. Since various types of mechanically operating mechanisms, such as a diaphragm shutter mechanism, are disposed inside the camera main body, dust or the like are sometimes generated from these mechanisms during the operation.

In Japanese Patent Application Laid-Open No. 2002-229110, there is described an art to remove dust and dirt on a front surface of an imaging element. Japanese Patent Application Laid-Open No. 2004-32191 describes an art in which there is disposed a dust control member for sealing or protecting the side of a photoelectric conversion surface of the imaging element to thereby prevent the dust and dirt from being attached to the photoelectric conversion surface of the imaging element. Further in this publication, as to the dust and dirt sticking to the surface of the dust control member, there is described removing means for applying to the dust control member a vibration having a predetermined amplitude by excitation means to thereby remove the dust and dirt. In the electronic imaging device of the Japanese Patent Application Laid-Open No. 2004-32191, a vibration mode is selectively changed to drive the device by the excitation means, accordingly at least the vibration is generated, and sound for announcement of a state is generated if desired.

BRIEF SUMMARY OF THE INVENTION

According to the present invention, in an electronic imaging device having: an imaging element; and a mechanism which removes dust attached to the imaging element or an optical element disposed on a front side of the imaging element, the device comprising a display section which displays that at least the mechanism is operating.

Accordingly, an operator of the electronic imaging device can correctly recognize whether or not the mechanism to remove the dust is operating. Since generation of sound is not required in the recognition of the operation, quiet operation recognition is possible without any erroneous recognition of another operation sound.

Examples of the dust removing mechanism include a excitation mechanism which vibrates a dustproof filter disposed in front of the imaging element. Usually in a case where the dustproof filter is vibrated by such excitation mechanism, when a vibration frequency exceeds a human audio region, the operator cannot recognize the operation state of the excitation mechanism based on the operation sound. According to the present invention, since the operation state of the excitation mechanism is displayed in the display section, the operator can correctly recognize the operation state.

Additionally, the dust removing mechanism is not limited to the excitation mechanism. For example, this may be a mechanism which removes the dust attached to the imaging element or the optical element disposed in front of the imaging element via a gas flow. A mechanism which removes the dust by a wiper may also be used.

According to the present invention, since it is displayed in the display section that the dust removing mechanism is operating, the operator can correctly recognize that the mechanism is in the operation. However, this does not prohibit or limit use together with another method such as a method for informing the operator of the operation state, for example, by means of sound or vibration.

Examples of the display section include an LCD display section, an image monitor, a light emitting diode (LED) and the like which display operation situations of the electronic imaging device, but the section is not limited to them. In a case where the image monitor is used, an image of the dust can be superimposed and displayed on a monitor image in such a manner that the image of the dust moves on the monitor image (e.g., downwards or toward the outside of a screen), then the displayed image is easily understood by the operator.

Moreover, the displaying manner may be changed in accordance with the operation situation of the dust removing mechanism, or may include a display of a preparatory stage for the operation or a completed state as well as the display of the operating situation. For example, when a mode just comes into an operation mode of the mechanism but the dust removing operation is not yet performed, a first display (e.g., mode display) is shown. And when the dust removing operation is performed, a second display (e.g., operation display) is shown. When the operation is completed, a third display (e.g., completion display) may be shown.

Examples of the electronic imaging device include a digital camera, especially a digital single lens reflex camera, but the present invention is not limited to them.

According to the present invention, the operator can effectively perform the dust removing operation in the electronic imaging device with assistance of the clear display of the dust removing operation. Since the notification is not performed with the sound, quiet dust removal operation can be achieved. Consequently, there can be provided an electronic imaging device, as represented by an electronic camera, which is easy to use.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENTS

Preferred embodiments of the invention are described below with reference to the accompanying drawings.

An electronic imaging device of the present invention will be described hereinafter specifically. The device has a dust control function for an imaging element unit which obtains an image signal by photoelectric conversion. Here, an example will be described as an improved technology relating to dust control for an electronic camera (hereinafter referred to simply as the "camera"). Specifically, one embodiment of a lens-interchangeable single lens reflex electronic camera (digital camera) will be described with reference to FIGS. 1 to 20.

Figure 1:
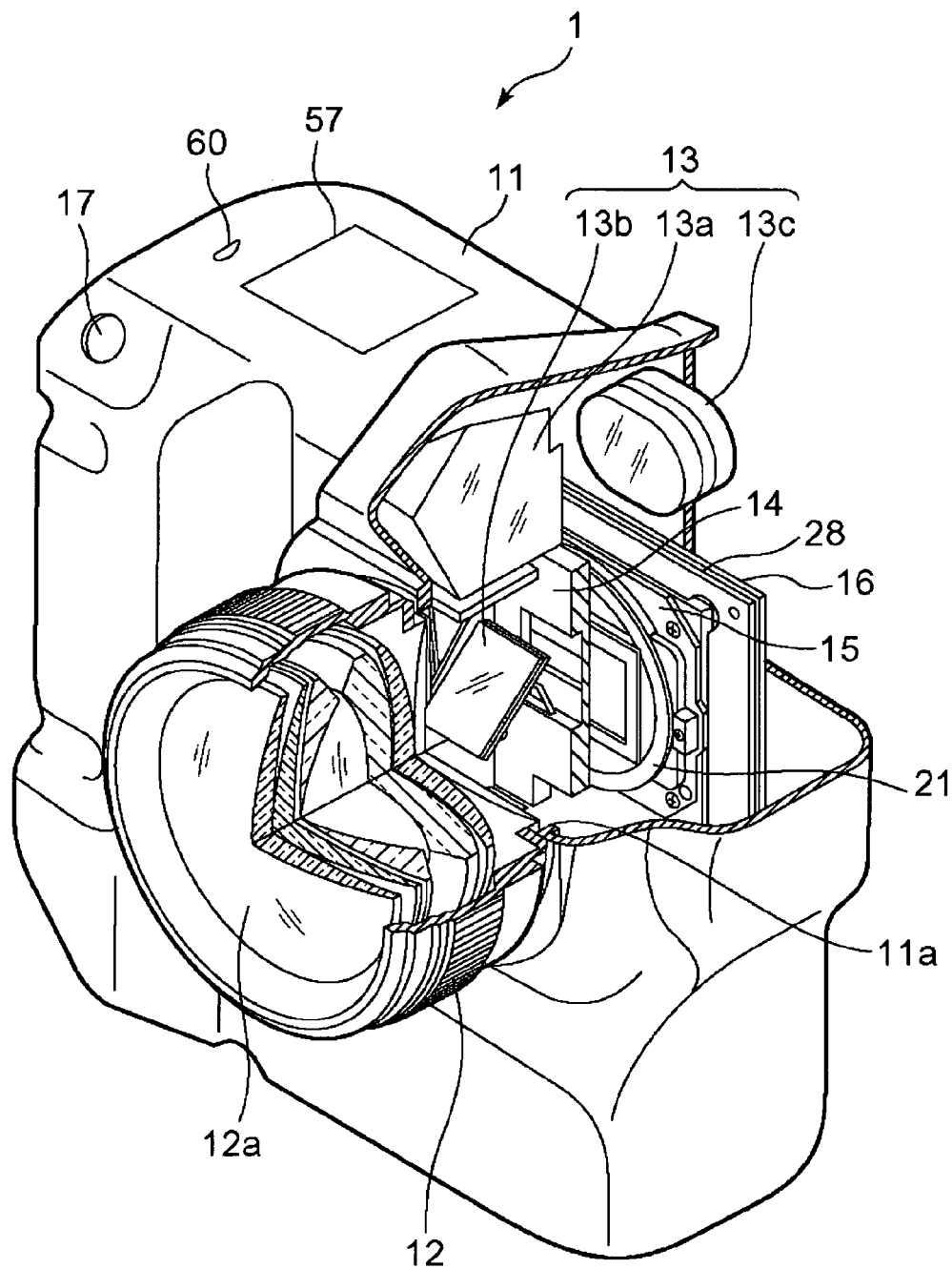
FIG. 1 is a partially cut perspective view of an electronic imaging device (electronic camera) according to one embodiment of the present invention, showing an internal mechanical structure.
Figure 2:
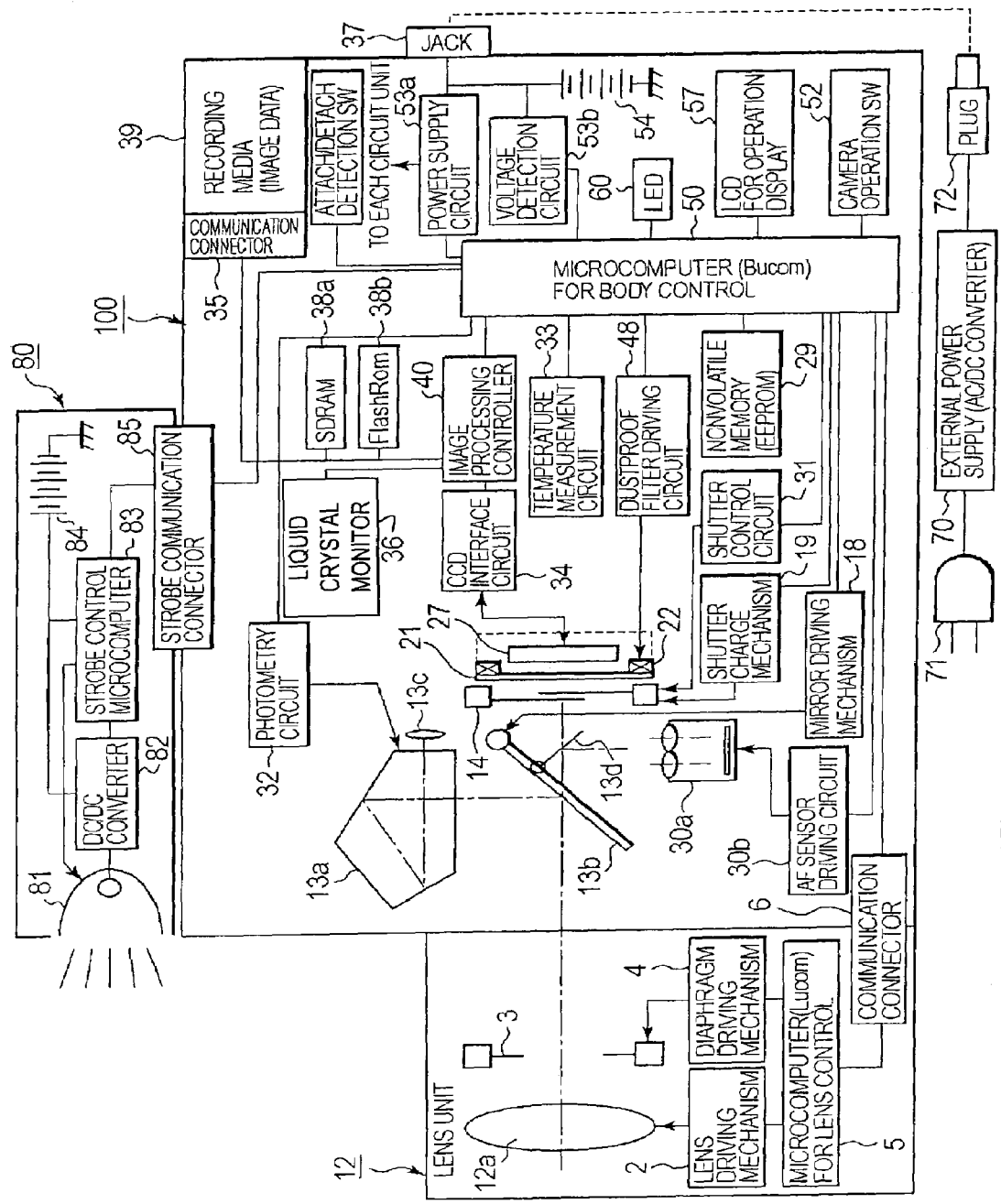
FIG. 2 is a block diagram schematically showing mainly an electrical constitution of the electronic camera.

First, a schematic constitution of the camera of the present embodiment will be described. FIGS. 1 and 2 show the constitution of a camera 1 according to the present embodiment. FIG. 1 is a partially cut perspective view of the camera 1 schematically showing an internal mechanical structure of the camera 1, and FIG. 2 is a block diagram schematically showing mainly an electrical constitution of the camera 1.

First, an appearance and a mechanical structure of the camera 1 will be described with reference to FIG. 1. The camera 1 of the present embodiment is constituted of a camera main body section 11 and a lens barrel 12 which are constituted separately from each other and which are mutually detachably attached.

The lens barrel 12 internally holds an imaging optical system 12a constituted of a plurality of lenses, a driving mechanism and the like. This imaging optical system 12a comprises, for example, a plurality of optical lenses and the like, and transmits a light flux from a subject to thereby form an image of the subject formed by the light flux of the subject in a predetermined position (on a photoelectric conversion surface (light receiving surface) of an imaging element 27 described later). Moreover, this lens barrel 12 is disposed in such a manner as to protrude toward a front surface of the camera main body section 11.

It is to be noted that a lens barrel similar to that generally utilized in a conventional camera or the like is applied to the lens barrel 12. Therefore, detailed description of the constitution is omitted. There are various types of constituting members inside the camera main body section 11. The front surface of the camera main body section 11 is provided with an imaging optical system attaching portion 11a which is a connecting member detachably connected to the lens barrel 12 holding the imaging optical system 12a. The camera main body section 11 is a so-called "single lens reflex type" of camera.

A substantially central portion of the camera main body section 11 on a front surface side thereof is provided with an aperture for exposure having such a predetermined bored diameter as to guide the subject light flux into the camera main body section 11, and the imaging optical system attaching portion 11a is formed in a peripheral edge portion of the aperture. An upper outer surface of the camera main body section 11 is provided with a display section (LCD for operation display) 57 formed of a liquid crystal display panel or the like. The display section 57 displays an exposure mode, a shutter speed, a diaphragm value and the like, and further display an operation of a dust control member described hereinafter.

Further on an outer surface side of the camera main body section 11, in predetermined positions such as an upper surface portion and a back surface portion, there are provided various types of operation members for operating the camera main body section 11, for example, a release button 17 which generates an instruction signal for starting a photographing operation. Among these operation members, the release button 17 only is shown in order to avoid complexity of the drawing.

Inside the camera main body section 11, various types of constituting members are disposed in predetermined positions as shown in FIG. 1. These constituting members include a finder unit 13, an imaging unit 15, and a plurality of circuit substrates (FIG. 1 shows a main circuit substrate 16 only). The finder unit 13 is disposed in order to form a desired subject image formed by the imaging optical system 12a in a predetermined position different from that on the photoelectric conversion surface of the imaging element 27, and constitutes a so-called "observation optical system". The imaging unit 15 includes a shutter section 14, the imaging element 27, and a dustproof filter 21. The shutter section 14 is provided with a shutter mechanism or the like which controls an irradiation time of the photoelectric conversion surface of the imaging element 27 with the subject light flux and the like. The imaging element 27 is imaging means for obtaining an image signal corresponding to the subject image formed based on the subject light flux which has passed through the imaging optical system 12a, and is a photoelectric conversion element. The dustproof filter 21 is an optical element and a dust control member disposed in a predetermined position on the photoelectric conversion surface of the imaging element 27 on a front side to prevent dust and dirt from being attached to the photoelectric conversion surface, and is filter means. In the main circuit substrate 16, there are mounted various types of electric members which form electric circuits such as an image signal processing circuit which performs various types of signal processing on the image signal acquired by the imaging element 27.

The finder unit 13 includes a reflective mirror 13b, a penta prism 13a, and an eyepiece unit 13c. The reflective mirror 13b folds an optical axis of the subject light flux which has passed through the imaging optical system 12a, and guides the light flux toward the observation optical system. The penta prism 13a receives the light flux emitted from this reflective mirror 13b to form an upright normal image. The eyepiece unit 13c forms an image having an optimum form for enlarging and observing the image formed by the penta prism 13a.

The reflective mirror 13b is constituted in such a manner as to be movable between a position retracted from the optical axis of the imaging optical system 12a and a predetermined position on the optical axis. In a usual state, the reflective mirror 13b is disposed at a predetermined angle, for example, of 45° with respect to the optical axis of the imaging optical system 12a. Accordingly, as to the subject light flux which has passed through the imaging optical system 12a, when the camera 1 is in a usual state, the optical axis of the flux is bent by the reflective mirror 13b, and reflected toward the penta prism 13a disposed above the reflective mirror 13b.

On the other hand, while the camera 1 is executing the photographing operation, the reflective mirror 13b moves to a predetermined position retracted from the optical axis of the imaging optical system 12a during an actual exposure operation. Accordingly, the subject light flux is guided toward the imaging element 27 to irradiate the photoelectric conversion surface.

In the shutter section 14, a section similar to a generally used section in a conventional camera or the like is applied such as a focal plane type of shutter mechanism and a driving circuit which controls the operation of the shutter mechanism. Therefore, description of a detailed constitution will be omitted.

An electric constitution will be described later in detail with reference to FIG. 2.

Subsequently, a detailed structure of the imaging unit 15 will be described hereinafter in the camera 1 of the present embodiment.

Figure 3:
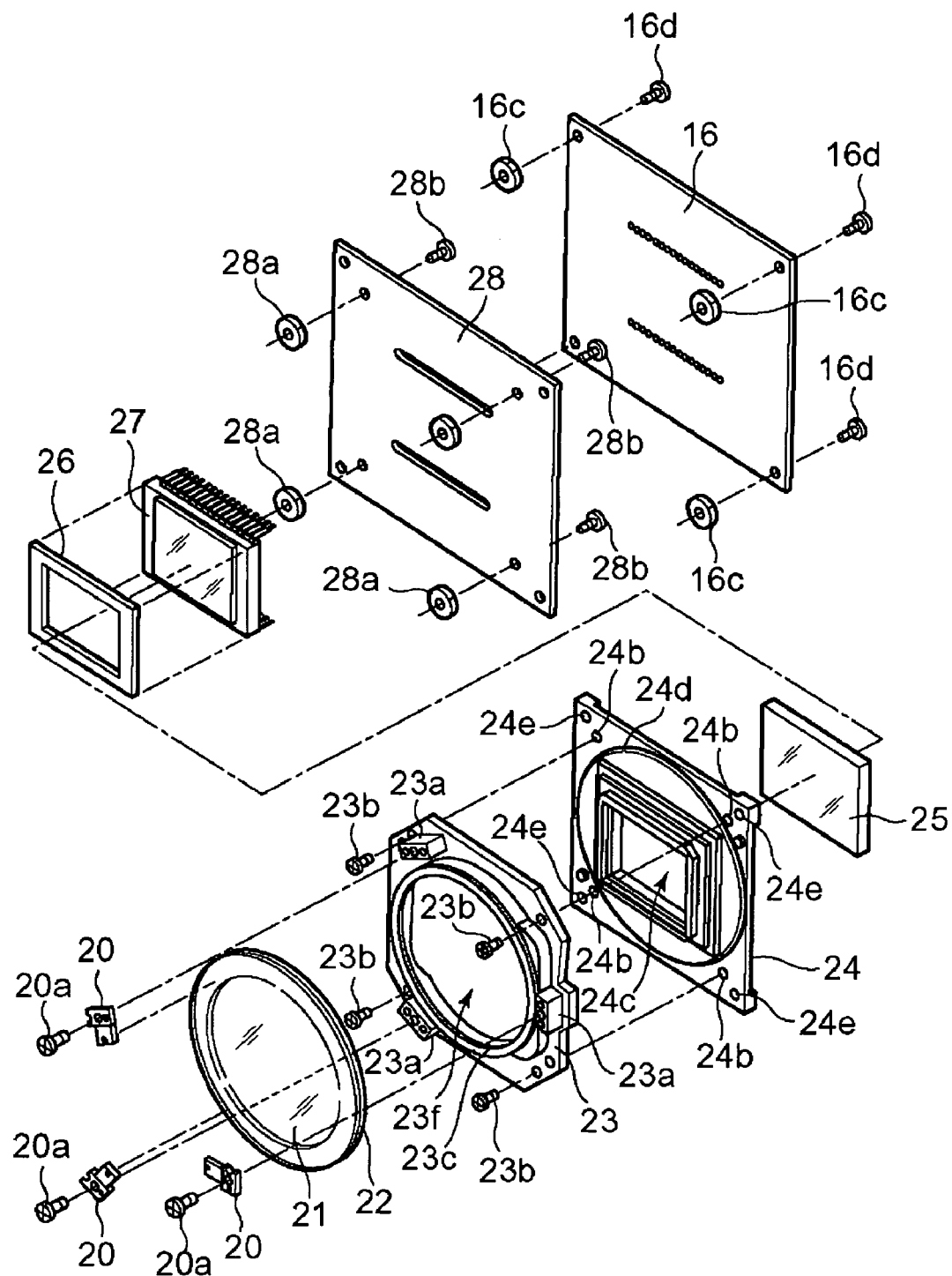
FIG. 3 is a main part exploded perspective view showing an exploded imaging unit in the electronic camera.
Figure 4:
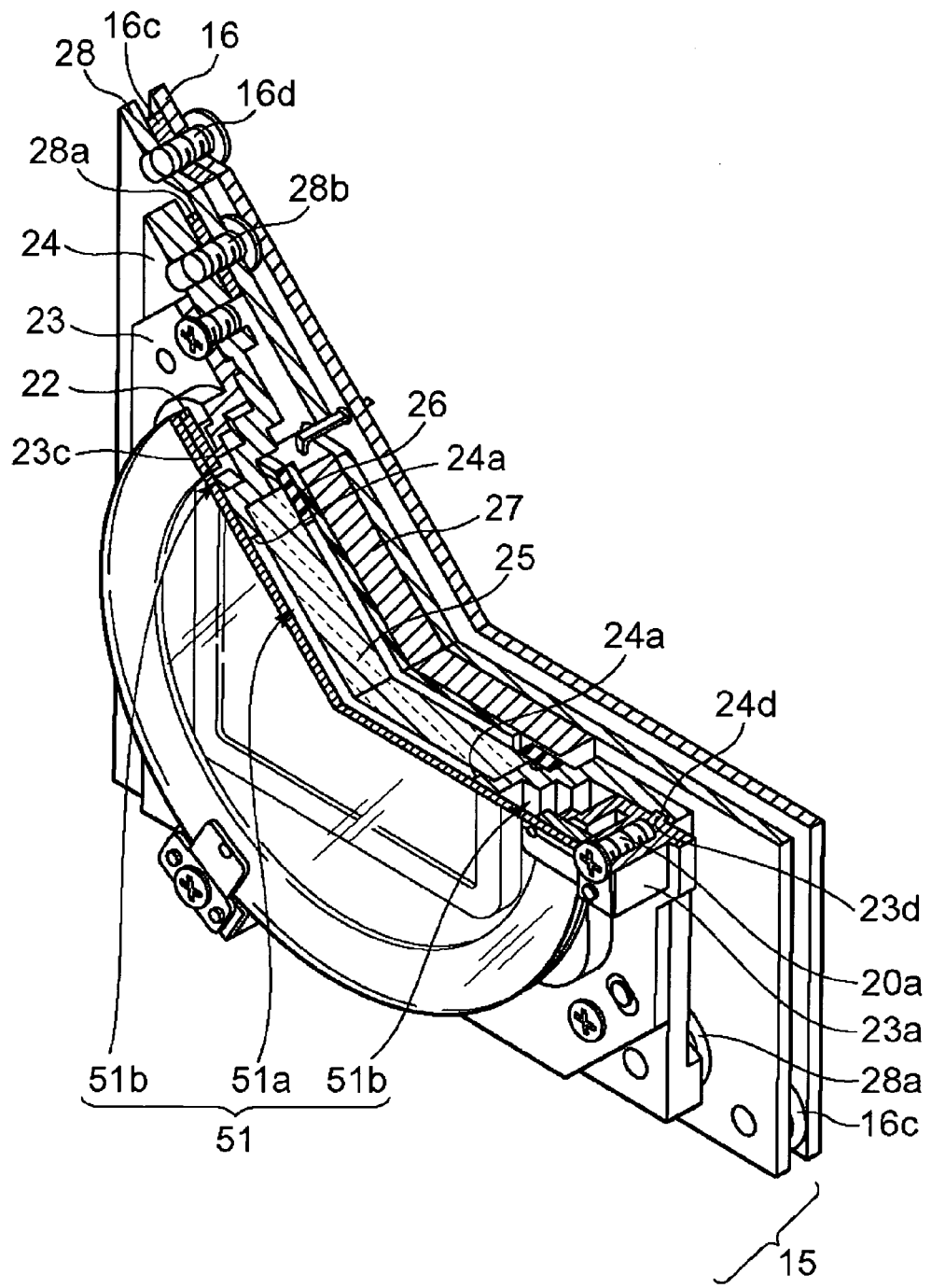
FIG. 4 is a partially cut perspective view of the imaging unit having an assembled state.
Figure 5:
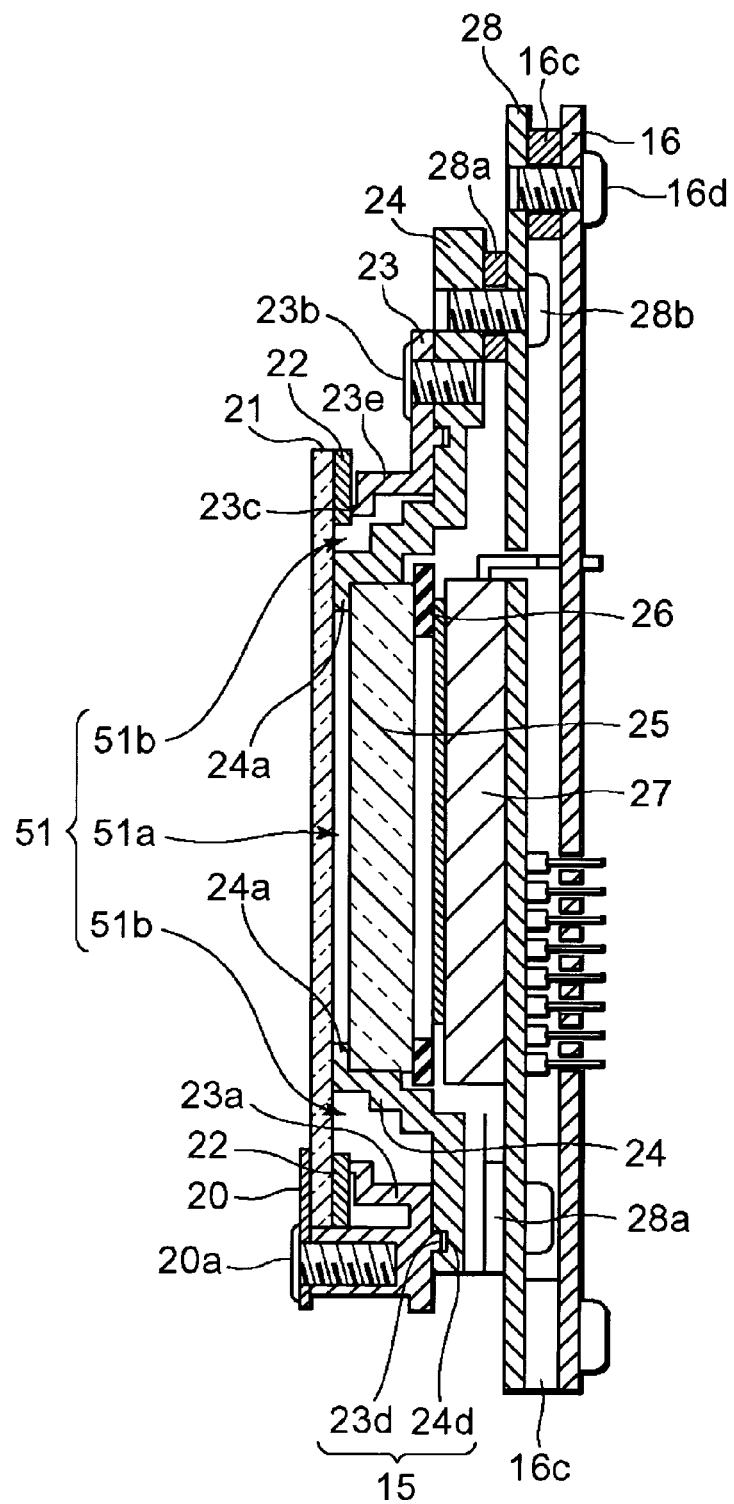
FIG. 5 is a sectional view along the cut section of the electronic camera shown in FIG. 4.

In FIGS. 3 to 5, a part of the imaging unit in the camera 1 of the present embodiment is extracted and shown. FIG. 3 is a main part exploded perspective view showing the imaging unit. FIG. 4 is a partially cut perspective view of the imaging unit having an assembled state, and FIG. 5 is a sectional view along the cut section of FIG. 4.

It is to be noted that in the present embodiment, the imaging unit 15 of the camera 1 is a unit comprising a plurality of members including the shutter section 14 as described above, but in FIGS. 3 to 5, a main section is simply shown, and the drawing of the shutter section 14 is omitted. In FIGS. 3 to 5, not only the imaging unit 15 but also the main circuit substrate 16 are shown in order to show positional relations between constituting members. This is because the main circuit substrate 16 is disposed in the vicinity of the imaging unit 15, is provided with the imaging element 27, and is implemented with electric circuits for imaging system including an image signal processing circuit and a working memory and the like. It is to be noted that as to details of the main circuit substrate 16 itself, since a substrate generally utilized in a conventional camera or the like is applied, description thereof is omitted.

The imaging unit 15 has: the imaging element 27 which is a CCD or the like; an imaging element fixing plate 28; an optical low pass filter (hereinafter referred to as the "optical LPF") 25; a low pass filter receptacle member 26; and an imaging element storage case member 24 (second member; hereinafter referred to as the "CCD case 24"). In addition, the imaging unit 15 has: the dustproof filter 21; a dustproof filter receptacle member 23 (first member); a piezoelectric element 22; a dustproof filter driving section 48 (not shown in FIGS. 3 to 5. See FIG. 2); and presser members 20.

The imaging element 27 outputs an image signal in response to light which has passed through the imaging optical system 12a and with which its photoelectric conversion surface has been irradiated. The imaging element fixing plate 28 is a thin plate-like member which fixes and supports this imaging element 27. The optical LPF 25 is disposed on the side of the photoelectric conversion surface of the imaging element 27, and removes high-frequency components from the subject light flux which has passed through the imaging optical system 12a to irradiate the surface. The low pass filter receptacle member 26 is disposed on a peripheral edge portion between the optical LPF 25 and the imaging element 27, and is formed of a substantially frame-shaped elastic member or the like. The CCD case 24 is disposed in such a manner as to contain, fix, and hold the imaging element 27, and supportably bring the optical LPF 25 into contact with a peripheral edge portion of the case or the vicinity of the portion, and in such a manner that a predetermined portion of the case comes into close contact with the dustproof filter receptacle member 23. The dustproof filter receptacle member 23 is disposed on the side of the front surface of the CCD case 24, so that the dustproof filter 21 (dust control member) is supportably brought into close contact with a peripheral edge portion of the member and the vicinity of the portion. The dustproof filter 21 is supported by the dustproof filter receptacle member 23, and disposed at a predetermined position where the dustproof filter 21 keeps a predetermined distance to the optical LPF 25 in the front side of the optical LPF 25 and in the side of the photoelectric conversion surface of the imaging element 27. The piezoelectric element 22 is excitation means or a member for excitation which is disposed in the peripheral edge portion of the dustproof filter 21 and which applies a predetermined vibration to the dustproof filter 21 and which is constituted, for example, of electromechanical conversion element or the like. The dustproof filter driving section 48 is a driving circuit which drives this piezoelectric element 22. The presser members 20 are constituted of elastic members which airtightly bond the dustproof filter 21 to the dustproof filter receptacle member 23 to fix and hold the filter.

The imaging element 27, which is imaging means, receives on its photoelectric conversion surface the subject light flux which has passed through the imaging optical system 12a to perform photoelectric conversion, and accordingly acquires the image signal corresponding to the subject image formed on the photoelectric conversion surface. For example, a charge coupled device (CCD) is applied to the imaging element 27, but the present invention is not limited to this device, and, for example, a CMOS is also applicable.

The imaging element 27 is mounted on a predetermined position of the main circuit substrate 16 via the imaging element fixing plate 28. As described above, both of the image signal processing circuit and the working memory or the like are implemented on the main circuit substrate 16 to process an output signal from the imaging element 27, that is, the image signal obtained by photoelectric conversion.

The optical LPF 25 is disposed on the side of the front surface of this imaging element 27 via the low pass filter receptacle member 26. Moreover, the CCD case 24 is disposed as a case member for containing the imaging element in such a manner as to cover the LPF.

A rectangular aperture 24c is disposed substantially in a central portion of the CCD case 24, and the optical LPF 25 and the imaging element 27 are disposed in the aperture 24c from a rear side of the aperture. As shown in FIGS. 4 and 5, stepped portions 24a whose sections are formed substantially into L-shapes are formed on inner peripheral edge portions behind the aperture 24c.

As described above, the low pass filter receptacle member 26 constituted of an elastic member or the like is disposed between the optical LPF 25 and the imaging element 27. In peripheral edge portions of the imaging element 27 on the side of the front surface of the element, the low pass filter receptacle member 26 is disposed in such a position as to avoid an effective region of the photoelectric conversion surface, and the member abuts on the vicinity of the peripheral edge portion of the optical LPF 25 on the side of the back surface of the optical LPF 25. Moreover, the low pass filter receptacle member 26 substantially keeps air tightness between the optical LPF 25 and the imaging element 27. Accordingly, an elastic force by the low pass filter receptacle member 26 works on the optical LPF 25 in an optical axis direction.

Moreover, the peripheral edge portion of the optical LPF 25 on the side of the front surface thereof is disposed in such a manner that the portion is substantially airtightly brought into contact with the stepped portions 24a of the CCD case 24. According to this constitution, the position of the optical LPF 25 in the optical axis direction is regulated against the elastic force by the low pass filter receptacle member 26 for displacing the optical LPF 25 in the optical axis direction. In other words, the position of the optical LPF 25 inserted from the back surface side into the aperture 24c of the CCD case 24 is regulated in the optical axis direction by the stepped portions 24a. Consequently, the optical LPF 25 does not drop out of the CCD case 24 toward the front surface side.

After the optical LPF 25 is inserted from the back surface side into the aperture 24c of the CCD case 24 in this manner, the imaging element 27 is disposed on the side of the back surface of the optical LPF 25. In this case, in the peripheral edge portion, the low pass filter receptacle member 26 is sandwiched between the optical LPF 25 and the imaging element 27.

Moreover, as described above, the imaging element 27 is mounted on the main circuit substrate 16 via the imaging element fixing plate 28. Moreover, the imaging element fixing plate 28 is fixed to screw holes 24e on the back surface side of the CCD case 24 by screws 28b via spacers 28a. The main circuit substrate 16 is fixed to the imaging element fixing plate 28 by screws 16d via spacers 16c.

On the front surface side of the CCD case 24, the dustproof filter receptacle member 23 is fixed to screw holes 24b of the CCD case 24 by screws 23b. In this case, as shown in detail in FIGS. 4 and 5, peripheral groove 24d are formed substantially in annular shape on a peripheral edge side and the front surface side of the CCD case 24. On the other hand, in a predetermined position on the peripheral edge side and the back surface side of the dustproof filter receptacle member 23, protruding portion 23d (not shown in FIG. 3) is formed in annular shape over a whole periphery corresponding to the annular groove 24d of the CCD case 24. Therefore, when the annular protruding portion 23d fits into the peripheral groove 24d, the CCD case 24 and the dustproof filter receptacle member 23 substantially airtightly fit into each other in the circle region, that is, a region in which the peripheral groove 24d and the annular protruding portion 23d are formed.

The dustproof filter 21 entirely has a circular or polygonal plate shape, at least a center and its vicinity region constitutes a transparent portion, and this transparent portion is disposed facing the front surface side of the optical LPF 25 with a predetermined interval.

Moreover, for example, by means such as bonding by an adhesive, the piezoelectric element 22 for vibrating the dustproof filter 21 is disposed integrally with the peripheral edge portion of one surface (back surface side in the present embodiment) of the dustproof filter 21. The piezoelectric element 22 is a predetermined member for excitation, and is constituted of an electromechanical conversion element or the like. When a driving voltage having a predetermined cycle is applied to this piezoelectric element 22 by a dustproof filter driving section (not shown), a predetermined vibration, that is, a standing wave vibration can be generated in the dustproof filter 21. Moreover, the dustproof filter 21 is fixed and held by the presser members 20 constituted of elastic materials such as leaf springs so that the filter is airtightly bonded to the dustproof filter receptacle member 23.

An aperture 23f having a circular or polygonal shape is disposed in the vicinity of the substantially central portion of the dustproof filter receptacle member 23. The aperture 23f is set to such a sufficient size as to transmit the subject light flux which has passed through the imaging optical system 12a. Accordingly, the photoelectric conversion surface of the imaging element 27 disposed behind is irradiated with the light flux.

A wall portion 23e (see FIGS. 4, 5) which protrudes toward the front surface is formed into a substantially annular shape on the peripheral edge portion of the aperture 23f. On a tip side of the wall portion 23e, a receptacle portion 23c is formed in such a manner as to protrude toward the front surface.

On the other hand, in the vicinity of an outer peripheral edge portion of the dustproof filter receptacle member 23 on the front surface side, a plurality of (three in the present embodiment) protruding portions 23a are formed in predetermined positions in such a manner as to protrude toward the front surface side. The protruding portions 23a are used in fixing the presser members 20 which fix and hold the dustproof filter 21. The presser members 20 are fixed to tip portions of the protruding portions 23a by screws 20a or the like. The presser members 20 are members constituted of elastic materials such as leaf springs as described above. Base end portions of the members are fixed to the protruding portions 23a, and free end portions thereof abut on the outer peripheral edge portion of the dustproof filter 21. According to this constitution, the presser members 20 press the dustproof filter 21 toward the dustproof filter receptacle member 23, that is, toward the optical axis direction.

In this case, when a predetermined portion of the piezoelectric element 22 disposed on the outer peripheral edge portion of the dustproof filter 21 on the back surface side abuts on the receptacle portion 23c, positions of the dustproof filter 21 and the piezoelectric element 22 in the optical axis direction are regulated. Therefore, the dustproof filter 21 is fixed and held in such a manner as to be airtightly bonded to the dustproof filter receptacle member 23 via the piezoelectric element 22.

In other words, the dustproof filter receptacle member 23 is airtightly bonded to the dustproof filter 21 via the piezoelectric element 22 by urging forces by the presser members 20.

Additionally, as described above, the dustproof filter receptacle member 23 and the CCD case 24 are set so that the peripheral groove 24d and the annular protruding portion 23d (see FIGS. 4, 5) mutually fit substantially air-tightly. Simultaneously, the dustproof filter receptacle member 23 and the dustproof filter 21 are set in such a manner as to be airtightly bonded to each other via the piezoelectric element 22 by the urging forces of the presser members 20. The optical LPF 25 disposed in the CCD case 24 is disposed in such a manner as to be substantially airtight between the peripheral edge portions of the optical LPF 25 on the front surface side and the stepped portions 24a of the CCD case 24. Furthermore, on the back surface side of the optical LPF 25, the imaging element 27 is disposed via the low pass filter receptacle member 26, and substantial airtightness is also held between the optical LPF 25 and the imaging element 27.

Therefore, a predetermined void portion 51a is formed in a space via which the optical LPF 25 faces the dustproof filter 21. A space portion 51b is formed by the peripheral edge portion of the optical LPF 25, that is, by the CCD case 24, the dustproof filter receptacle member 23, and the dustproof filter 21. This space portion 51b is a sealed space formed in such a manner as to expand to the outside of the optical LPF 25 (see FIGS. 4, 5). The space portion 51b is set in such a manner as to be a space broader than the void portion 51a. Moreover, a space constituted of the void portion 51a and the space portion 51b is a sealed space 51 substantially airtightly sealed by the CCD case 24, the dustproof filter receptacle member 23, the dustproof filter 21, and the optical LPF 25 as described above.

As described above, in the imaging unit 15 in the camera 1 of the present embodiment, a sealed structure portion is formed in peripheral edges of the optical LPF 25 and the dustproof filter 21 to form the substantially tightly sealed space 51 including the void portion 51a. Moreover, this sealed structure portion is disposed in a position outside the peripheral edge of the optical LPF 25 or the vicinity.

Furthermore, in the present embodiment, the sealed structure portion is constituted by the dustproof filter receptacle member 23 which is the first member for supportably bonding the dustproof filter 21 to the peripheral edge portion or a vicinity portion. Furthermore, the sealed structure portion is constituted also by the CCD case 24 or the like as the second member which supportably bonds the optical LPF 25 to the peripheral edge portion or a vicinity position and which is disposed in such a manner as to come into close contact with the dustproof filter receptacle member 23 (first member) via its predetermined portion.

In the camera 1 of the present embodiment constituted as described above, the dustproof filter 21 is disposed in a predetermined position on the front surface side of the imaging element 27 to face each other, and the sealed space 51 is formed between the photoelectric conversion surface of the imaging element 27 and the peripheral edge of the dustproof filter 21. According to this constitution, dust and dirt are prevented from being attached to the photoelectric conversion surface of the imaging element 27. In this case, the dust and dirt attached to an exposed surface of the dustproof filter 21 on the front surface side can be removed, when a periodic voltage is applied to the piezoelectric element 22 disposed integrally with the peripheral edge portion of the dustproof filter 21 to impart a predetermined vibration to the dustproof filter 21.

Here, the vibration will be described as the dust removing operation of the dustproof filter 21.

Figure 6:
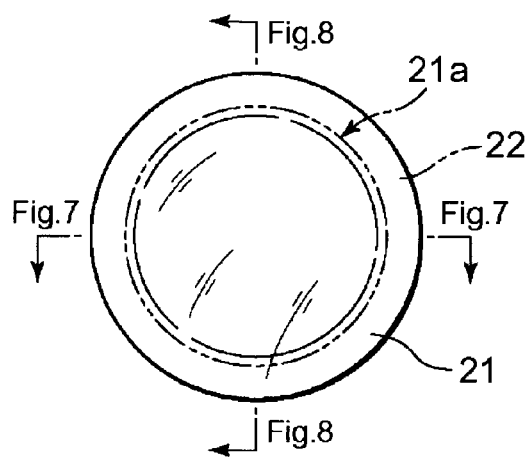
FIG. 6 is a front view in which there are only extracted and shown a dustproof filter and a piezoelectric element disposed integrally with the filter of the imaging unit in the electronic camera.

FIG. 6 is a front view in which there are only extracted and shown the dustproof filter 21 and the piezoelectric element 22 disposed integrally with the filter of the imaging unit 15 in the camera 1.

Figure 7:
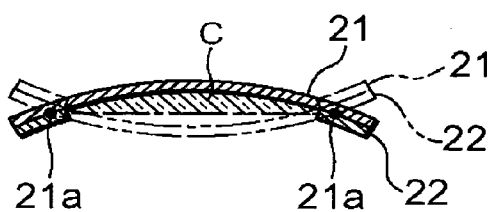
FIG. 7 is a sectional view along a cut line of the piezoelectric element of FIG. 6, showing state changes of the dustproof filter and the piezoelectric element in a case where a periodic driving voltage is applied.
Figure 8:
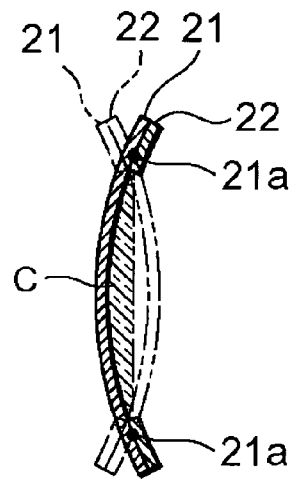
FIG. 8 is similarly a sectional view along the cut line of the piezoelectric element of FIG. 6.

Moreover, FIGS. 7 and 8 show state changes of the dustproof filter 21 and the piezoelectric element 22 in a case where a periodic driving voltage is applied to the piezoelectric element 22 of FIG. 6, FIG. 7 is a sectional view along a cut line of FIG. 6, and FIG. 8 is a sectional view along another cut line of FIG. 6.

For example, when a minus (−) voltage is applied to the piezoelectric element 22, the dustproof filter 21 is deformed as shown by solid lines in FIGS. 7, 8. On the other hand, when a plus (+) voltage is applied to the piezoelectric element 22, the dustproof filter 21 is deformed as shown by dotted lines in the figures.

In this case, since an amplitude substantially turns to zero in a position of a node of the vibration as shown by code 21a of FIGS. 6 to 8. Therefore, the receptacle portion 23c of the dustproof filter receptacle member 23 is set in such a manner as to abut on a portion corresponding to the node 21a in a vibration amplitude direction. Accordingly, the dustproof filter 21 can be efficiently supported without blocking any vibration. Moreover, when the periodic voltage is applied to the piezoelectric element 22 in this state, the dustproof filter 21 vibrates, and the dust and dirt attached to the surface of the dustproof filter 21 are removed.

It is to be noted that when the periodic voltage having such a frequency as to resonate the dustproof filter 21 is applied, the amplitude is enlarged to several tens to several hundreds of times, and a vibration effective for removing the dust and dirt can be generated. A resonance frequency at this time is decided in accordance with a shape, a plate thickness, a material or the like of the dustproof filter 21. In the above-described examples shown in FIGS. 6 to 8, there is shown a case where a primary flexural vibration is generated.

Figure 9:
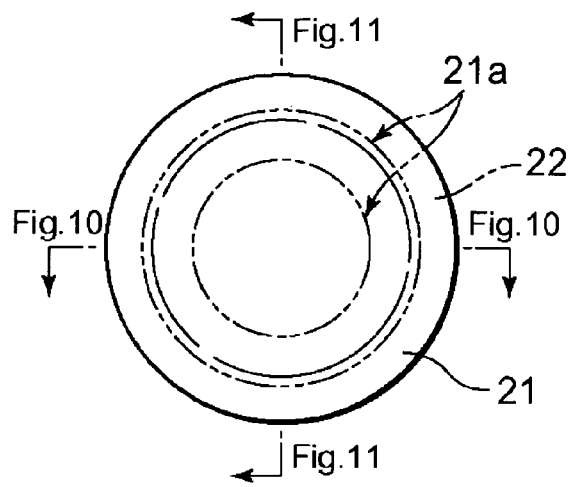
FIG. 9 is a front view showing a behavior in a case where a secondary vibration is generated in the dustproof filter having the same constitution as that of FIG. 6, and there are only extracted and shown the dustproof filter and the piezoelectric element disposed integrally with the filter of the imaging unit in the electronic camera in the same manner as in FIG. 6.
Figure 10:
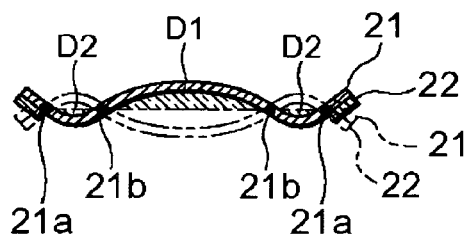
FIG. 10 is a sectional view along a cut line of the piezoelectric element of FIG. 9, showing the state changes of the dustproof filter and the piezoelectric element in a case where a periodic voltage for generating the secondary vibration is applied.
Figure 11:
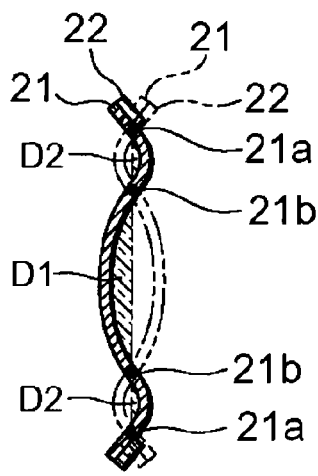
FIG. 11 is similarly a sectional view along the cut line of the piezoelectric element of FIG. 9.

Furthermore, in another example shown in FIGS. 9 to 11, there is shown a behavior in a case where a secondary vibration is generated in the dustproof filter having the same constitution as that shown in the examples of FIGS. 6 to 8.

In this case, FIG. 9 is a front view in which there are only extracted and shown the dustproof filter 21 and the piezoelectric element 22 disposed integrally with the filter of the imaging unit 15 in the camera 1 in the same manner as in FIG. 6.

FIGS. 10 and 11 show the state changes of the dustproof filter 21 and the piezoelectric element 22 in a case where a periodic voltage for generating the secondary vibration in the piezoelectric element 22 of FIG. 9 is applied to the piezoelectric element 22 of FIG. 9, FIG. 10 is a sectional view along a cut line of FIG. 9, and FIG. 11 is a sectional view along another cut line of FIG. 9.

For example, when a minus (−) voltage is applied to the piezoelectric element 22, the dustproof filter 21 is deformed as shown by solid lines in FIGS. 10, 11. On the other hand, when a plus (+) voltage is applied to the piezoelectric element 22, the dustproof filter 21 is deformed as shown by dotted lines in the figures.

In this case, two pairs of nodes exist in this vibration as shown by codes 21a, 21b in FIGS. 9 to 11. The receptacle portion 23c of the dustproof filter receptacle member 23 is set in such a manner as to abut on a portion corresponding to the node 21a. In this design, the dustproof filter 21 can be efficiently supported without blocking any vibration in the same manner as in the example shown in FIGS. 6 to 8.

Therefore, in this dust control mechanism, when the periodic voltage is applied to the piezoelectric element 22 in a predetermined timing, the dustproof filter 21 vibrates, and the dust and dirt attached to the surface of the dustproof filter 21 can be removed.

Here, a system constitution of the camera will be described in detail according to the present embodiment.

As shown in a block diagram of FIG. 2, this camera system has: a body unit 100 as a camera main body; and the lens unit (i.e., lens barrel) 12 as an interchangeable lens which is an example of an accessory device (hereinafter referred to simply as the "accessory"). Furthermore, the camera system is also provided with recording media 39 in which photographed image data is recorded beforehand, an external power supply 70, an externally disposed strobe unit 80 and the like.

The lens barrel 12 is detachably attached via a lens mount (not shown) disposed on the front surface of the body unit 100. A user can attach the desired lens unit 12 to the body unit 100.

The recording media 39 are external recording media such as various types of memory card and externally attached HDD, and are interchangeably attached via a communication connector 35 in such a manner as to be communicatable with the camera main body.

The external power supply 70 has an AC/DC converter function, and a connector 71 and a plug 72 are attached. For example, when the plug 72 is inserted into a jack 37 on a camera main body side, a required power can be supplied from a household power supply outlet.

Moreover, the strobe unit 80 has a flashbulb 81, a DC/DC converter 82, a strobe control microcomputer 83, and a battery 84, and can be attached communicatably with the camera main body via a strobe communication connector 85.

The lens unit 12 is controlled by a microcomputer (hereinafter referred to as "Lucom") 5 for controlling the lens unit. The body unit 100 is controlled by a microcomputer (hereinafter referred to as "Bucom") 50 for controlling the body unit. It is to be noted that the Lucom 5 can be communicatably and electrically connected to the Bucom 50 via a communication connector 6, when the lens unit 12 is attached to the body unit 100. Moreover, as the camera system, the Lucom 5 accessorily operates in cooperation with the Bucom 50.

The photographing lens 12a and a diaphragm 3 are disposed in the lens unit 12. The photographing lens 12a is driven by a DC motor (not shown) disposed in a lens driving mechanism 2. The diaphragm 3 is driven by a stepping motor (not shown) disposed in a diaphragm driving mechanism 4. The Lucom 5 controls each of the motors in accordance with an instruction of the Bucom 50.

The body unit 100 is provided with constituting members shown in FIG. 2. For example, there are disposed: single lens reflex type of constituting members (penta prism 13a, quick return mirror 13b, eyepiece lens 13c, sub-mirror 13d) as an optical system; the focal plane type of shutter section 14 on the optical axis; and an AF sensor unit 30a for receiving a reflected light flux from the sub-mirror 13d to perform automatic distance measurement.

Moreover, there are disposed: an AF sensor driving circuit 30b which drives and controls the AF sensor unit 30a; a mirror driving mechanism 18 which drives and controls the quick return mirror 13b; a shutter charge mechanism 19 which charges a spring for driving a front curtain and a back curtain of the shutter section 14; a shutter control circuit 31 which controls movements of the front curtain and the back curtain; and a photometry circuit 32 which performs photometry based on the light flux from the penta prism 13a.

The imaging element (CCD unit) 27 for photoelectrically converting the subject image which has passed through the above-described optical system is disposed as a photoelectric conversion element, and protected by the dustproof filter 21 as an optical element disposed between the CCD unit 27 and the photographing lens 12a. Furthermore, as a part of excitation means for vibrating the dustproof filter 21 at a predetermined frequency, for example, the piezoelectric element 22 is attached to the peripheral edge portion of the dustproof filter 21.

Moreover, the piezoelectric element 22 has two electrodes (described in detail later), and the piezoelectric element 22 as a part of the excitation means vibrates the dustproof filter 21 by the dustproof filter driving section 48 so that the dust attached to the filter surface can be removed. Therefore, this camera system is an electronic camera having a basic structure which belongs to a so-called "camera provided with the dust control function". It is to be noted that a temperature measurement circuit 33 is disposed in the vicinity of the dustproof filter 21 in order to measure a temperature around the imaging element 27.

This camera system is also provided with: a CCD interface circuit 34 connected to the imaging element 27; a liquid crystal monitor 36; and an image processing controller 40 which processes the image utilizing an SDRAM 38a, a FlashROM 38b, the recording media 39 and the like disposed as storage regions. The system is constituted in such a manner as to provide an electronic recording display function together with an electronic imaging function.

As another storage region, a nonvolatile memory 29 constituted, for example, of an EEPROM is disposed as nonvolatile storage means for storing a predetermined control parameter required for controlling the camera. The memory is disposed in such a manner as to be accessible from the Bucom 50.

The Bucom 50 is provided with: the LCD 57 for operation display which notifies the user of an operation state of the camera by a display output; and a camera operation SW 52. Here, the LCD 57 for operation display is provided with a display section which displays a vibrating operation of the dustproof filter 21 in a period in which the dustproof filter driving section is operating. The camera operation SW 52 is a switch group including operation buttons required in operating the camera, such as a release SW, a mode change SW, and a power SW. Furthermore, there are disposed: a battery 54 as a power supply; and a power supply circuit 53a which converts a voltage of the power supply into a voltage required in each circuit unit constituting the camera system to supply the voltage. There is also disposed a voltage detection circuit 53b which detects a voltage change at a time when a current is supplied from the external power supply 70 via the jack 71.

Each component of the camera system constituted as described above operates as follows.

First, the image processing controller 40 controls the CCD interface circuit 34 in accordance with the instruction of the Bucom 50 to take in image data from the imaging element 27. The image data is converted into a video signal by the image processing controller 40, and output and displayed in the liquid crystal monitor 36. The user can confirm the photographed image from the image displayed in the liquid crystal monitor 36.

The SDRAM 38a is a memory for temporary storage of the image data, and is used in a working area or the like in converting the image data. After this image data is converted into JPEG data, the data is stored in the recording media 39.

The imaging element 27 is protected by the transparent dustproof filter 21. The piezoelectric element 22 for exciting the surface of the filter is disposed in the peripheral edge portion of the dustproof filter 21, and the piezoelectric element 22 is driven by the dustproof filter driving section 48 which also functions as the driving means for the element as described above.

The imaging element 27 and the piezoelectric element 22 are integrally stored in a case (CCD case 24) surrounded with a frame member including the dustproof filter 21 as one surface and shown by a broken line, and the case has a structure preferable for dust control.

Usually, the temperature influences an elastic coefficient of a material made of glass, and is one of factors to change an inherent vibration number. Therefore, during the operation, the temperature is preferably measured to consider the change of the inherent vibration number. Therefore, it is better to measure a temperature change of the dustproof filter 21 disposed for protecting the front surface of the imaging element 27 whose temperature rapidly rises during the operation, and estimate the inherent vibration number at this time.

In the present embodiment, a sensor (not shown) connected to the temperature measurement circuit 33 is disposed in order to measure a peripheral temperature of the imaging element 27. It is to be noted that a temperature measurement point of the sensor is preferably set in the vicinity of a pole of a vibration surface of the dustproof filter 21.

The mirror driving mechanism 18 is a mechanism for driving the quick return mirror 13b to UP and DOWN positions. When the quick return mirror 13b is in the DOWN position, the light flux from the photographing lens 12a is divided and guided toward the AF sensor unit 30a and the penta prism 13a. When the quick return mirror 13b is disposed in the UP position, the light flux from the photographing lens 12a reaches the imaging element 27.

An output from an AF sensor in the AF sensor unit 30a is transmitted to the Bucom 50 via the AF sensor driving circuit 30b to perform well-known distance measurement.

Moreover, the user can visually checks the subject from the eyepiece lens 13c disposed adjacent to the penta prism 13a. A part of the light flux which has passed through the penta prism 13a is guided into a photosensor (not shown) in the photometry circuit 32, and the well-known photometry is performed based on a detected quantity of light.

Next, there will be described driving and operating of the dustproof filter 21 of the camera provided with the dust control function in the present embodiment with reference to a circuit diagram of the dustproof filter driving section 48 shown in FIG. 12 and a time chart shown in FIG. 13.

Figure 12:
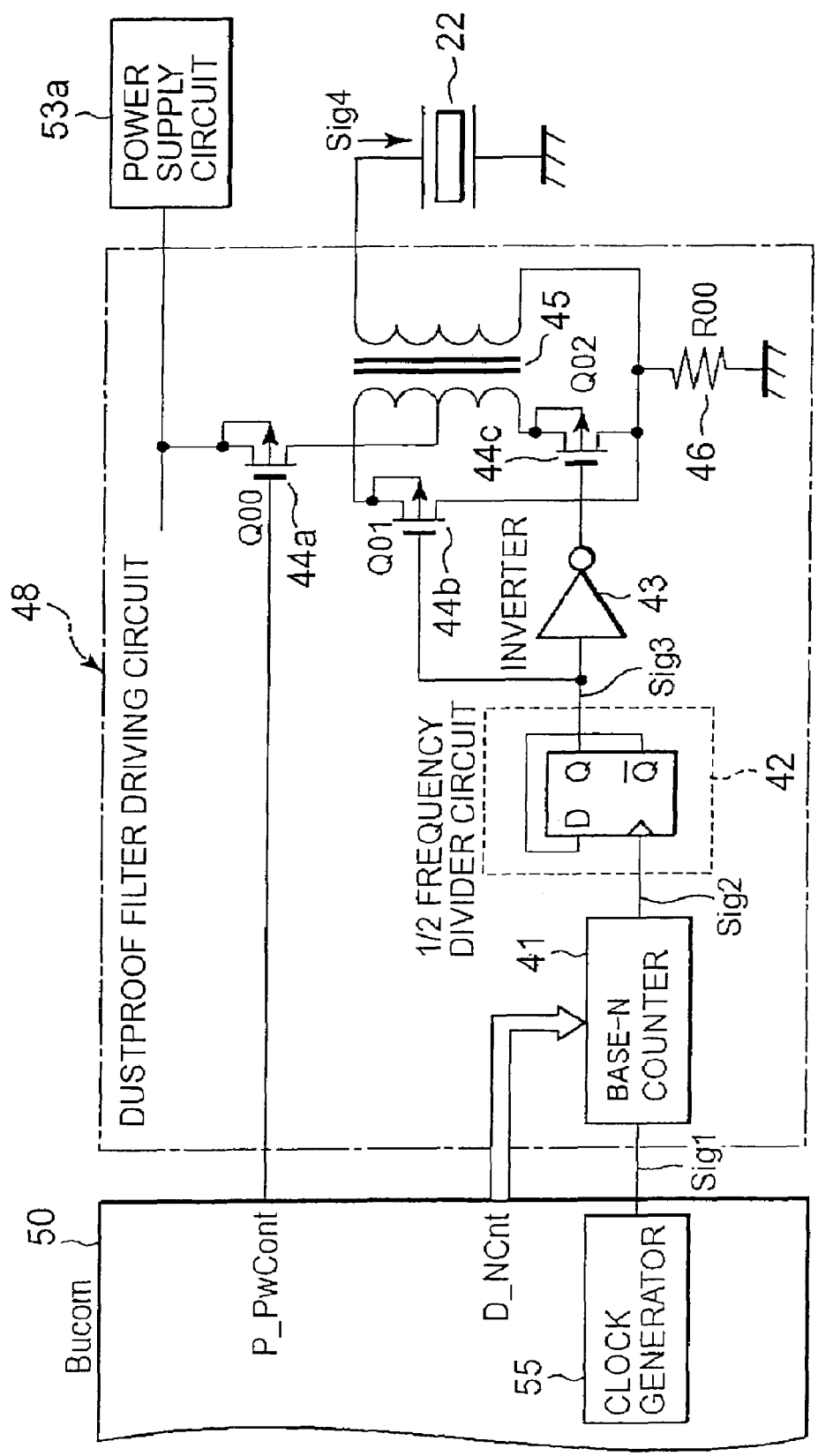
FIG. 12 is a circuit diagram showing a constitution of a dustproof filter driving circuit.
Figure 13:
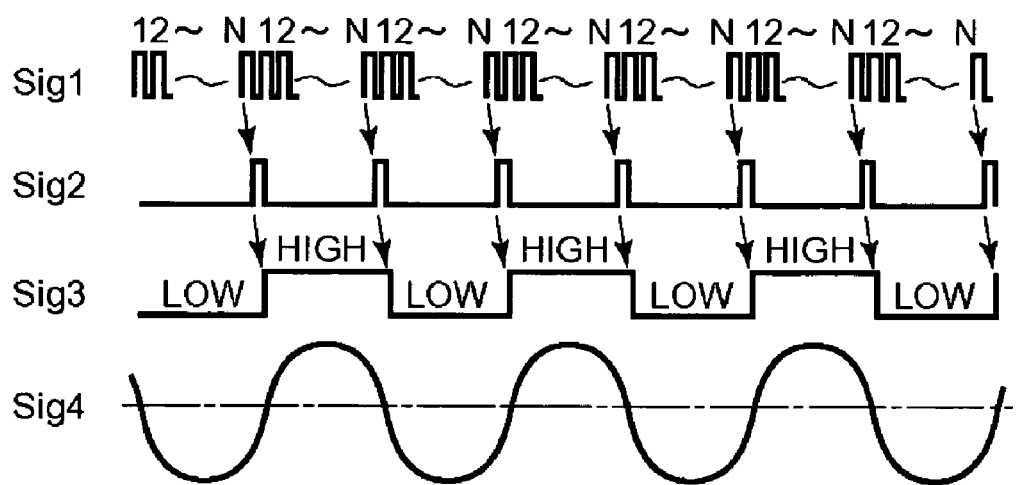
FIG. 13 is a time chart showing a waveform signal which relates to driving and operating of the dustproof filter.

The dustproof filter driving section 48 illustrated here has a circuit constitution as shown in FIG. 12, signals (Sig1 to Sig4) having waveforms shown in the time chart of FIG. 13 are generated in components of the constitution, and the filter is controlled as follows based on the signals.

As shown in FIG. 12, the dustproof filter driving section 48 has a base-N counter 41, a ½ frequency divider circuit 42, an inverter 43, a plurality of MOS transistors (Q00, Q01, Q02) 44a, 44b, 44c, a transformer 45, and a resistance (R00) 46.

The signal (Sig4) having a predetermined period is generated on a secondary side of the transformer 45 by ON/OFF switching operations of the transistor (Q01) 44b and the transistor (Q02) 44c connected to a primary side of the transformer 45. Based on this signal having the predetermined period, the piezoelectric element 22 is driven, and the dustproof filter 21 is resonated.

The Bucom 50 controls the dustproof filter driving section 48 as follows via two IO ports P_PwCont and D_NCnt disposed as control ports and a clock generator 55 disposed inside the Bucom 50. The clock generator 55 outputs a pulse signal (basic clock signal) to the base-N counter 41 at a frequency sufficiently higher than a signal frequency applied to the piezoelectric element 22. This output signal is the signal Sig1 having the waveform shown in the time chart of FIG. 13. Moreover, this basic clock signal Sig1 is input into the base-N counter 41.

The base-N counter 41 counts the pulse signal Sig1, and outputs a counting end pulse signal every time a predetermined value "N" is reached. That is, the frequency of the basic clock signal is divided into 1/N. This output signal is the signal Sig2 having a waveform shown in the time chart of FIG. 13.

A high and low duty ratio of this frequency-divided pulse signal Sig2 is not 1:1. Therefore, the duty ratio is converted into 1:1 through the ½ frequency divider circuit 42. It is to be noted that this converted pulse signal corresponds to the signal Sig3 having a waveform shown in the time chart of FIG. 13.

In a high state of this converted pulse signal Sig3, the MOS transistor (Q01) 44b into which the signal has been input turns on. On the other hand, this pulse signal is reversed and applied to the transistor (Q02) 44c via the inverter 43. Therefore, in a low state of the pulse signal, the transistor (Q02) 44c into which the signal has been input turns on. When the transistor (Q01) 44b and the transistor (Q02) 44c connected to the primary side of the transformer 45 alternately turn on, a periodic signal such as the signal Sig4 is generated on the secondary side in FIG. 13. A winding rate of the transformer 45 is decided from an output voltage of the unit of the power supply circuit 53a and a voltage required in driving the piezoelectric element 22. It is to be noted that the resistance (R00) 46 is disposed in order to prevent flowing of an excessively large current through the transformer 45.

To drive the piezoelectric element 22, the transistor (Q00) 44a has to be in an ON state, and a voltage has to be applied from the power supply circuit 53a unit to a central tap of the transformer 45. In the figure, the transistor (Q00) 44a is ON/OFF controlled via the IO port P_PwCont. The set value "N" of the base-N counter 41 can be set from the IO port D_NCnt. Therefore, in the Bucom 50, when the set value "N" is appropriately controlled, the driving frequency of the piezoelectric element 22 can be arbitrarily changed.

In this case, the frequency can be calculated by the following equation (1):

$$fdrv = fpls/2N \tag{1}$$

wherein N: set value into the counter;

fpls: frequency of an output pulse of the clock generator; and fdrv: frequency of a signal applied to the piezoelectric element.

It is to be noted that calculation based on this equation is performed by a CPU (control means) of the Bucom 50.

Furthermore, characteristics of this camera 1 lie in that the camera is an electronic camera having a display section which informs the operator of the camera of the operation of the dustproof filter in a case where the dustproof filter is vibrated at a frequency of a non-audio region (frequency of 20 kHz or more). That is, the camera is the electronic camera having characteristics that the display section of the camera 1 is operated in cooperation with the operation of the driving circuit of the excitation means, and the operation of the dustproof filter is notified, when the excitation means (piezoelectric member) imparts the vibration to a vibration object member having light transmitting properties and capable of being vibrated (dustproof filter 21) disposed on the front surface of the imaging means (details will be described later).

To describe the above-described characteristics in detail, as to a control performed by the microcomputer (Bucom) 50 for camera body control, a specific control operation will be described with reference to FIGS. 14 and 15.

Figure 14:
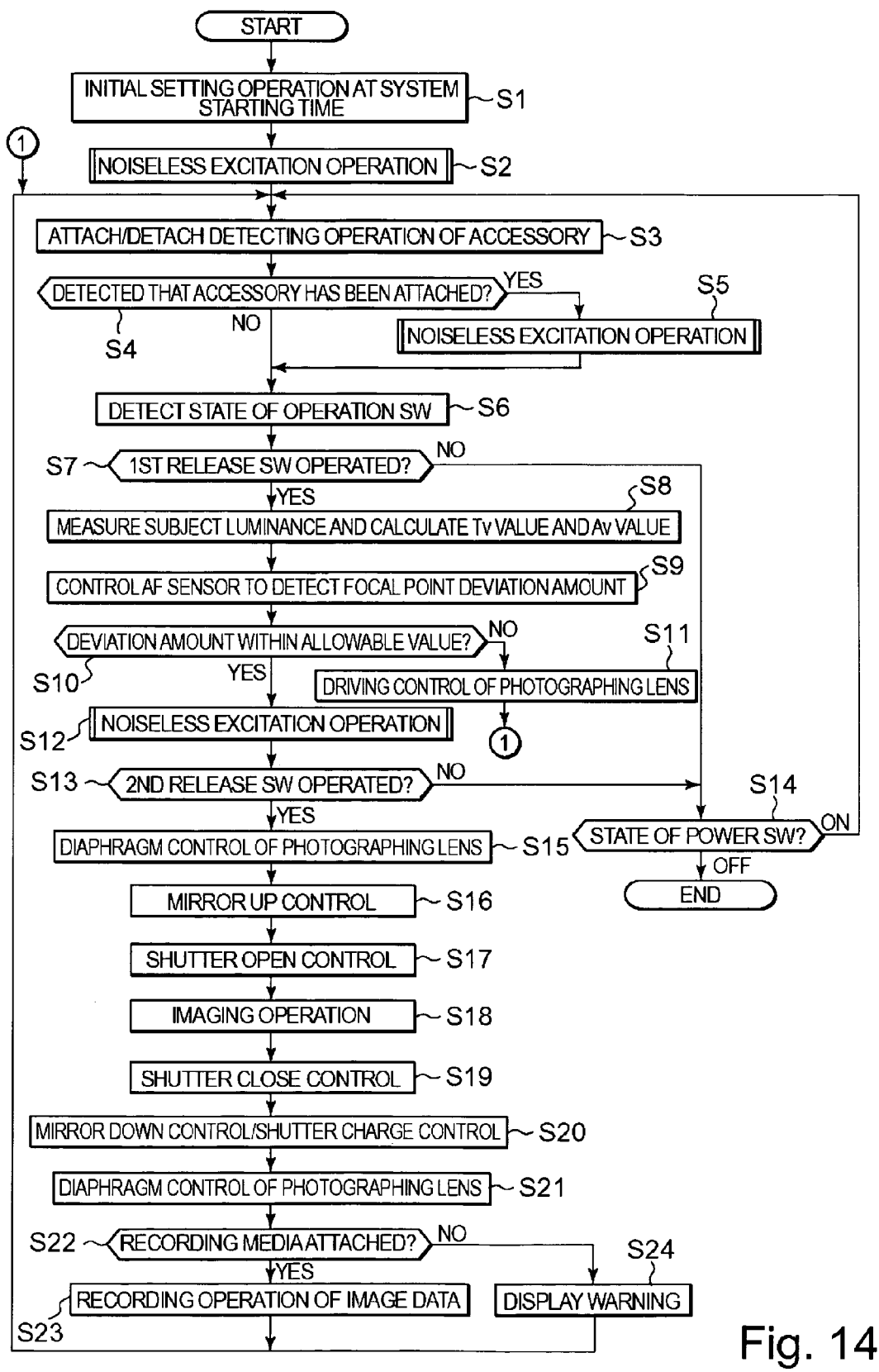
FIG. 14 is a flowchart showing an operation control in a camera sequence (main routine) executed by a microcomputer for controlling the electronic camera.

FIG. 14 is a flowchart showing an operation control of the camera of the present embodiment, and a procedure of a camera sequence (main routine) executed by the Bucom 50 is shown. FIG. 15 is a flowchart showing a procedure of a sub-routine "noiseless excitation operation" (also including a display operation).

As to a control program which can be operated by the Bucom 50 as shown in the flowchart shown in FIG. 14, an operation of the program starts, when the power supply SW (not shown) of the camera 1 is turned on.

First in step S1, processing for starting the camera system is executed. The Bucom 50 controls the power supply circuit 53a to supply a power to each circuit unit constituting the camera system. Initial setting of each circuit is also performed.

In step S2, the Bucom 50 calls the sub-routine "noiseless excitation operation" (see FIG. 15) described later to thereby vibrate the dustproof filter 21 without any noise (i.e., the operation sound is outside the audio region). It is to be noted that the audio region mentioned herein is within a range of about 20 Hz to 20000 Hz based on general person's hearing.

Subsequent steps S3 to S24 are a group of periodically executed steps. That is, the step S3 is a step for detecting attachment/detachment of an accessory with respect to the camera (e.g., in an attach/detach detecting operation to detect that the lens unit 12 as one of the accessories has been attached to the body unit 100, communication with the Lucom 5 is performed to thereby check an attached/detached state of the lens unit 12 is checked).

If in the step S4, the Bucom 50 detects that the predetermined accessory has been attached to the camera main body, in the step S5, the sub-routine "noiseless excitation operation" is called to vibrate the dustproof filter 21 without any noise.

Additionally, there is a high possibility that the dust sticks to each lens, the dustproof filter 21 or the like especially in a period in which any accessory (especially the lens unit 12) is not attached to the body unit 100 which is the camera main body. Therefore, it is effective to execute a dusting operation in a timing in which the attaching of the lens unit 12 is detected as described above. Since there is a high possibility that outside air circulates, and the dust enters to stick to the inside of the camera at a lens changing time, it is significant to remove the dust at the lens changing time. Moreover, the timing is regarded immediately before photographing, and the processing shifts to the step S6.

On the other hand, when in the step S4, the Bucom 50 dose not detect that the lens unit 12 has been attached to the body unit 100, the processing shifts to the next step S6 as such. In this step S6, a state of a predetermined operation switch of the camera is detected.

In the step S7, the Bucom 50 judges by the ON/OFF state of the SW whether or not a 1st release SW (not shown) constituting the release SW has been operated. When this state is read, and the 1st release SW is not turned on for a predetermined time or longer, the processing shifts to the step S14 described later to perform end processing (sleeping, etc.).

On the other hand, when the 1st release SW is turned on, in the step S8, luminance information of the subject is obtained from the photometry circuit 32. Moreover, an exposure time (Tv value) of the CCD unit 27 and a diaphragm set value (Av value) of the lens unit 12 are calculated from the information.

Thereafter, in the step S9, the Bucom 50 obtains detected data of the AF sensor unit 30a via the AF sensor driving circuit 30b. A deviation amount of a focus is calculated based on the data.

In the step S10, the Bucom 50 judges whether or not the calculated deviation amount is within a permitted range. If not, a driving control for the photographing lens is performed in the step S11, and the processing returns to the step S3.

On the other hand, when the deviation amount is within the permitted range, in the step S12, the sub-routine "noiseless excitation operation" is called to vibrate the dustproof filter 21 without any noise.

Furthermore, in the step S13, the Bucom 50 judges whether or not a 2nd release SW (not shown) constituting the release SW has been turned on. When this 2nd release SW is in an ON state, the processing shifts to the subsequent step S15 to start a predetermined photographing operation (details will be described later). However, in an OFF state, the processing shifts to the step S14 to perform the end processing.

It is to be noted that during the imaging operation, an electronic imaging operation is controlled for a time corresponding to preset seconds (exposure seconds) for exposure.

As the photographing operation, the imaging of the subject is performed in a predetermined order from the step S15 to step S21. First, the Bucom 50 transmits the Av value to the Lucom 5, instructs the driving of the diaphragm 3 (step S15), and moves the quick return mirror 13b to the UP position (step S16). Moreover, running of the front curtain of the shutter section 14 is started to perform OPEN control (step S17), and execution of the "imaging operation" is instructed with respect to the image processing controller 40 (step S18). When ending the exposure (imaging) to the CCD unit 27 for a time indicated by the Tv value, the running of the back curtain of the shutter section 14 is started to perform CLOSE control (step S19). Moreover, the quick return mirror 13b is driven to the DOWN position, and a charging operation of the shutter section 14 is performed (step S20).

Thereafter, the Bucom 50 instructs the Lucom 5 to return the diaphragm 3 to an open position (step S21), and ends a series of imaging operation.

Subsequently, the Bucom 50 detects in the step S22 whether or not the recording media have been attached to the camera main body. If not, warning is displayed in the step S24. Moreover, the processing shifts to the step S3 again to repeat a similar series of processing. On the other hand, when the recording media are attached, in the step S23, the image processing controller 40 is instructed to record the photographed image data in the recording media 39. When the recording operation of the image data ends, the processing shifts to the step S3 again to repeat a similar series of processing.

As to a detailed relation between a vibration mode and sound, control procedures of the above-described three sub-routines will be described with reference to FIG. 15. It is to be noted that his "vibration mode" is the mode of the vibration caused by the excitation means.

Figure 15:
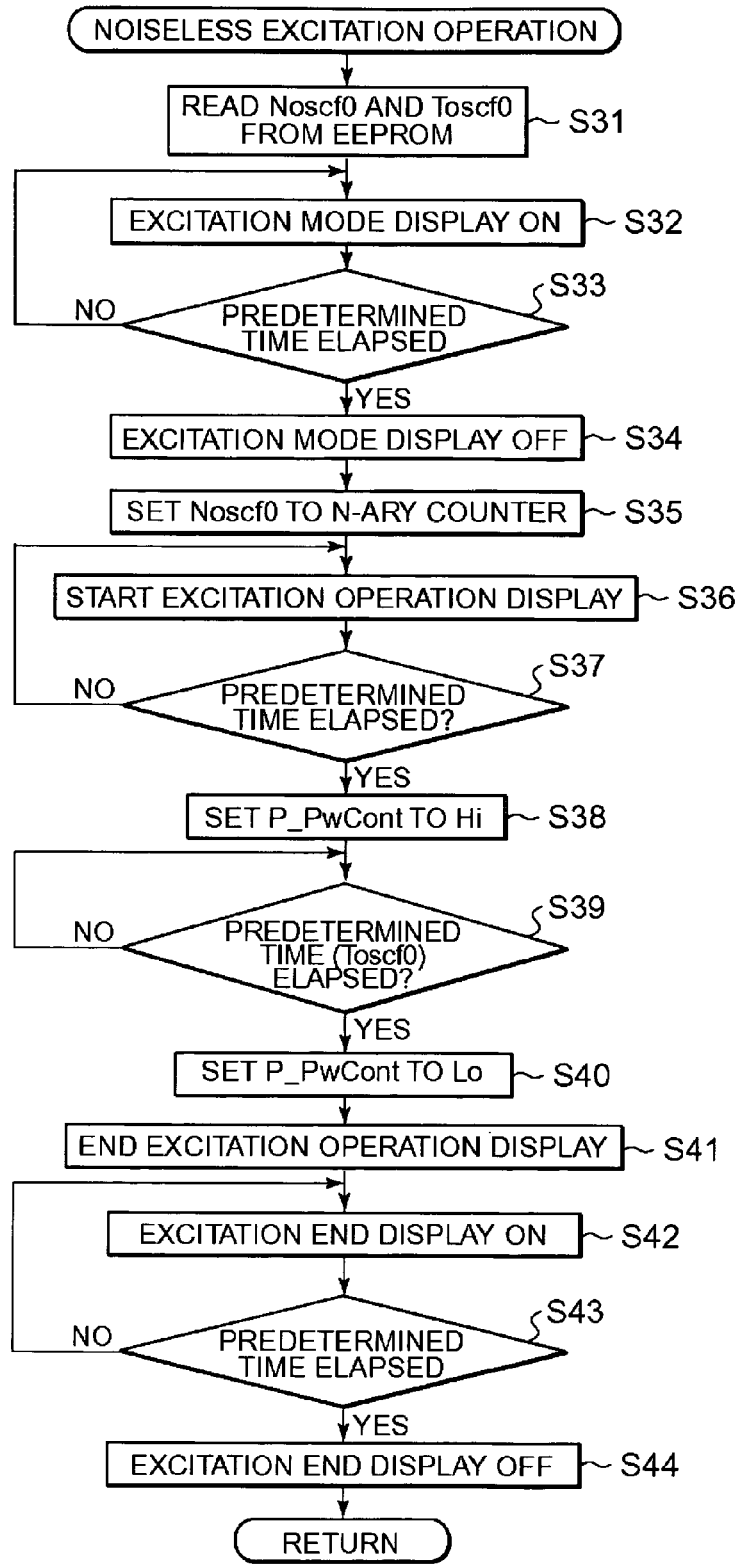
FIG. 15 is a flowchart showing an operation procedure of a sub-routine "noiseless excitation operation"
Figure 16:
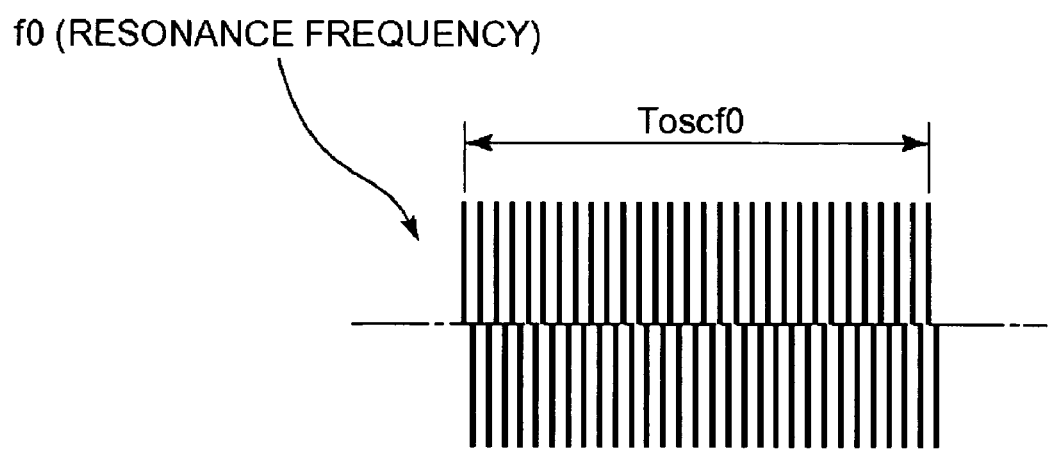
FIG. 16 is a graph showing a waveform of a resonance frequency continuously supplied to excitation means.

FIG. 15 is a flowchart showing an operation procedure of the "noiseless excitation operation", and FIG. 16 shows a graph of a waveform of a resonance frequency continuously supplied to the excitation means in this noiseless excitation operation.

Since the sub-routine "noiseless excitation operation" is a routine for a purpose of the excitation operation only for dust removal of the dustproof filter 21, a vibration frequency f0 is set to a resonance frequency of the dustproof filter 21. For example, in this case, since the vibration has a frequency of 40 kHz, at least 20 kHz or more, this is noiseless for the user.

First, in step S31, the Bucom 50 reads data concerning a driving time (Toscf0) and a driving frequency (resonance frequency: Noscf0) for vibrating the dustproof filter 21 from data stored in a predetermined region of the EEPROM 29. Subsequently, in step S32, display of an excitation mode is turned on in this timing. Next, it is judged in step S33 whether or not a predetermined time has elapsed. When the predetermined time has not elapsed, the display of the excitation mode continues, and the excitation mode display is turned off in step S34 after the elapse of the predetermined time.

Next, in step S35, the Bucom 50 outputs the driving frequency Noscf0 from the output port D_NCnt to the base-N counter 41 of the dustproof filter driving section 48.

In the subsequent step S36, the excitation operation display is started, and the elapse of the predetermined time is waited for in step S37. Thereafter, in steps S38 to S40, a dust removing operation is performed as follows. That is, first in step S38, when the Bucom 50 sets a control flag P_PwCont to a high value (Hi) for the dust removal, the piezoelectric element 22 excites the dustproof filter 21 at a predetermined driving frequency (Noscf0) to vibrate off the dust attached to the filter surface. When the dust attached to the dustproof filter surface is vibrated off in this dust removing operation, air vibration simultaneously occurs, and an ultrasonic wave is generated (additionally, even when the filter is driven at the driving frequency of Noscf0, sound within the audio region of the general person is not obtained or heard).

Next, in step S39, the Bucom 50 waits in a state in which the dustproof filter 21 is vibrated for a predetermined driving time (Toscf0). After the elapse of the predetermined driving time (Toscf0), in step S40, the control flag P_pwCont is set to a low value (Lo) to thereby end the excitation operation. Moreover, in step S41, the excitation operation display is ended.

Subsequently, when excitation end display is turned on in the step S42, it is judged in step S43 whether or not a predetermined time has elapsed. After the elapse of the predetermined time, the excitation end display is turned off in step S44. Moreover, the processing returns to a step next to the called step.

The vibration frequency f0 (resonance frequency (Noscf0)) and the driving time (Toscf0) applied to this sub-routine indicate the waveforms shown in the graph of FIG. 16. That is, a certain vibration (f0=40 kHz) indicates a continuous waveform which lasts for the time (Toscf0) sufficient for the dust removal.

That is, this vibration mode adjusts and controls the resonance frequency supplied to the excitation means.

It is to be noted that in the flowchart of FIG. 15, the timing of the control flag setting of the excitation operation and the processing timing of the display are not limited to those of the present embodiment.

Moreover, the present excitation operation is not limited to once, and may be repeatedly performed.

Figure 17:
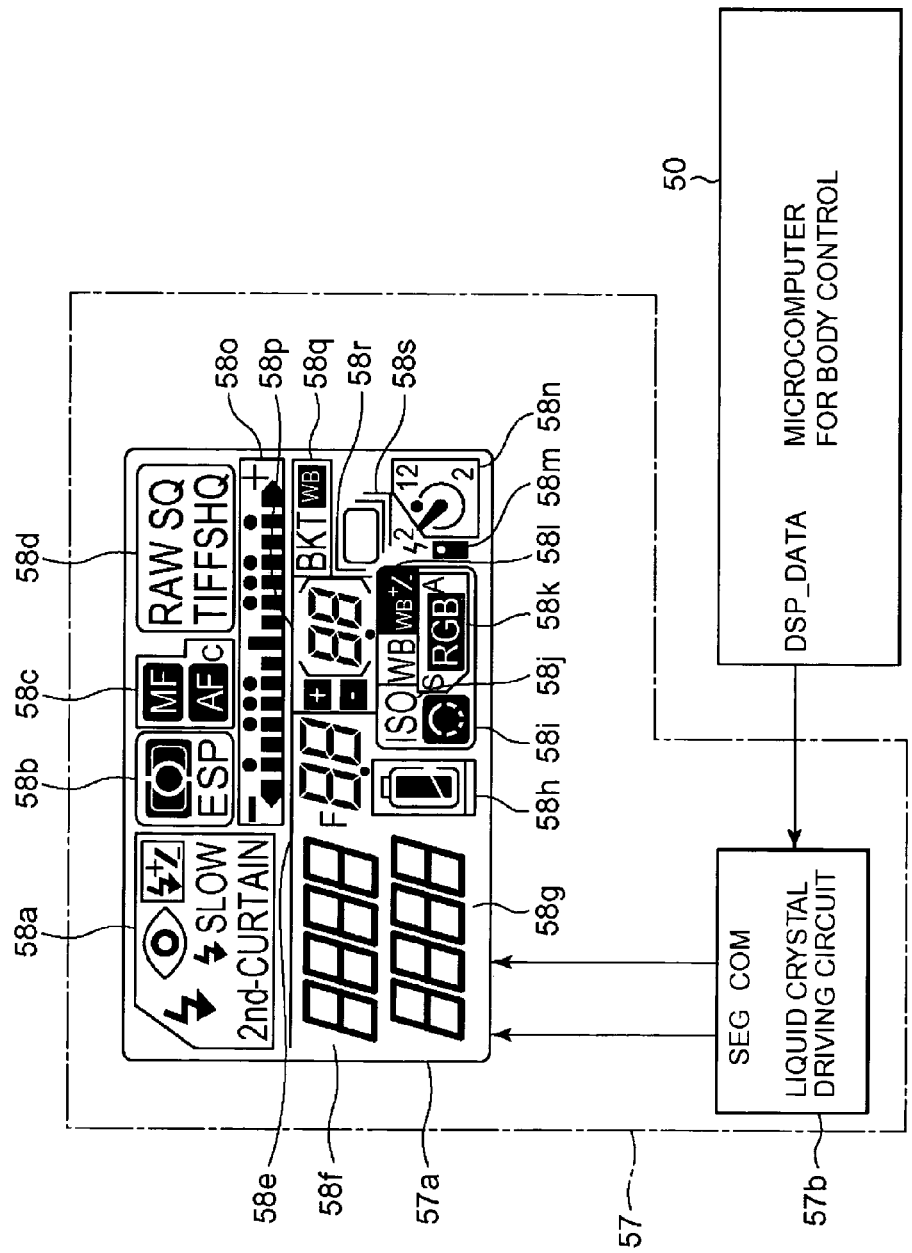
FIG. 17 is a block diagram showing details of display means.

FIG. 17 shows details of the display means of the present invention. The LCD 57 for operation display comprises a liquid crystal plate 57*a* and a liquid crystal driving circuit 57*b*. In FIG. 17, the liquid crystal plate 57*a* is shown in a state in which all segments are lit. In the liquid crystal plate 57*a*, a group of the segments denoted with reference numerals 58*a* to 58*s* displays patterns of a camera state as described below.

That is, reference numeral 58*a* denotes a pattern indicating a state of a flash mode, 58*b* denotes a pattern indicating a state of a photometry mode, 58*c* denotes a pattern indicating a state of a focus mode, 58*d* denotes a pattern of a state of a quality mode, 58*e* denotes a pattern indicating a state of a diaphragm mode, 58*f* denotes a pattern indicating a state of a shutter speed, and 58*g* denotes a pattern indicating a state of the number of images that can be photographed. Reference numeral 58*h* denotes a pattern indicating a state of a battery remaining amount, 58*i* denotes a pattern indicating a state of image adjustment, 58*j* denotes a pattern indicating a state of ISO, 58*k* denotes a pattern indicating a state of a color space, 58*l* denotes a pattern indicating a state of a white balance, 58*m* denotes a pattern indicating a state of a remote control, and 58*n* denotes a pattern indicating a state of a self timer. Furthermore, 58*o* denotes a pattern indicating states of an exposure level indicator, exposure correction indicator, and AF frame, 58*p* denotes a pattern indicating states of the number of images that can be continuously photographed, and exposure correction value display, 58*q* denotes a pattern showing a state of an auto bracket, 58*r* denotes a pattern indicating a state of noise reduction, and 58*s* denotes a pattern indicating a state of burst.

Now, data of display contents are output to the liquid crystal driving circuit 57*b* from the IO port DSP_DATA of the microcomputer 50 for body control. In response to the data of the display contents, the liquid crystal driving circuit 57*b* then outputs a SEG signal to select a specific pattern (e.g., specific character, number, picture) formed by each segment group of the liquid crystal plate 57*a*, and a COM signal to select a specific segment group for use in forming the specific pattern. Accordingly, the pattern corresponding to the display contents data is displayed in the liquid crystal plate 57*a*.

FIGS. 18A to 18H are diagrams showing more specific display contents of the present invention, and showing examples in which the states of the dust removing operation are displayed.

Here, in FIGS. 18A to 18H, there are only displayed two patterns of the pattern 58*f* of the shutter speed and the pattern of 58*g* of the number of the images that can be photographed, shown in FIG. 17. An upper stage is constituted of four segment groups, each segment group has seven segments to make one character, indicating the shutter speed, and a lower stage is constituted of four segment groups, each segment group has seven segments to make one character, indicating the number of the images that can be photographed. Usually, these segments indicate the shutter speed and the number of the images that can be photographed. For example, in FIG. 18A, there are displayed 8000 and 100 indicating a shutter speed of 1/8000 seconds and 100 images that can be photographed.

Figure 18A:
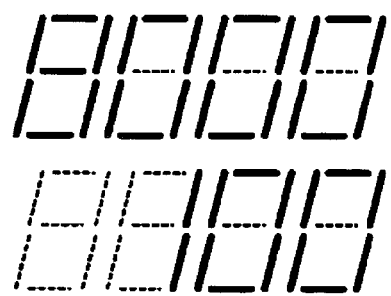
FIGS. 18A to 18H are diagrams showing display of the display means.
Figure 18B:
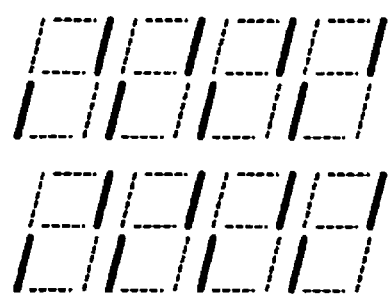
Figure 18C:
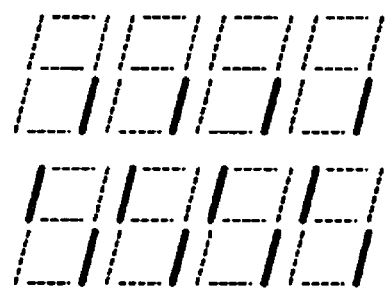
Figure 18D:
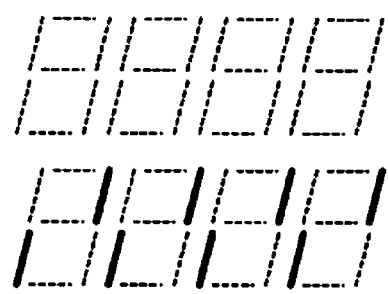
Figure 18E:
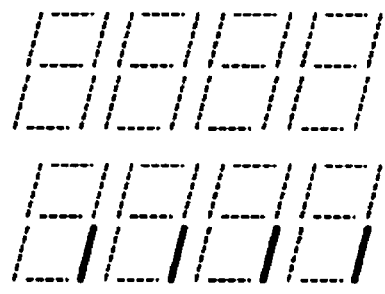
Figure 18F:
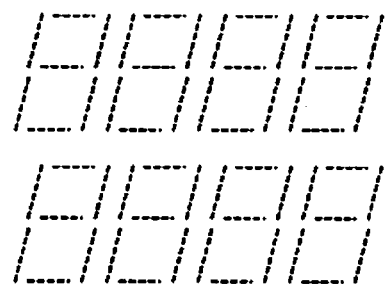
Figure 18G:
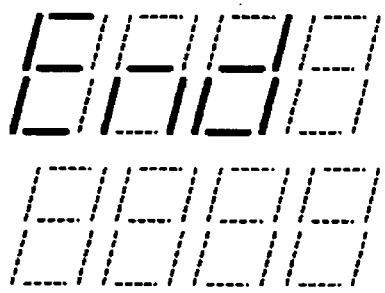
Figure 18H:
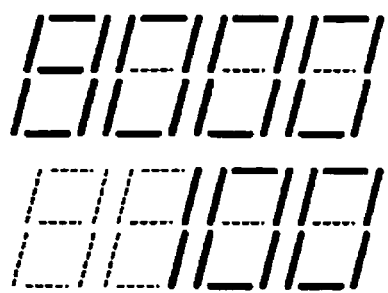

Here, when a noiseless excitation mode starts, the display turns to an excitation mode display shown in FIG. 18B, and the display of FIG. 18B is continued until the excitation operation is started. Next, when the excitation operation is started, FIGS. 18C, 18D, 18E, and 18F are successively displayed as the excitation operation display. Moreover, when the excitation operation is stopped, the display of FIG. 18G is continued as the excitation end display for a predetermined time to end one series of operation. After this display ends, the display returns to FIG. 18H which is the same as the first display.

As described above, the camera 1 (electronic imaging device) which is one example of the electronic imaging device of the present invention is the electronic camera having a structure in which the dustproof filter 21 is disposed in front of the imaging means (imaging element) in such a manner as to be vibrated by the piezoelectric element 22 (excitation means), and the time of the irradiation of the photoelectric element surface with the subject light flux is adjusted by the diaphragm 3 of the diaphragm mechanism and the shutter section 14 (shutter means). Moreover, based on the control of the Bucom 50 (control means) of the camera 1, the piezoelectric element 22 is driven in a predetermined vibration mode (any of the above-described three sub-routines) at a time when the accessory is attached as described above, a focusing time, a time immediately before the recording operation when any of the recording media is not attached and the like. Accordingly, the dust and dirt attached onto the dustproof filter 21 are removed. Simultaneously, a control is appropriately executed in such a manner that the state of the excitation operation is notified by the Bucom 50. Moreover, as described above, according to the camera 1, as the characteristics of the present invention, the predetermined situations relating to the excitation operation are notified to the user simultaneously with the dust removing operation for removing the dust.

Therefore, according to the present embodiment, it is possible to realize the electronic camera which can securely notify the situations of the excitation operation in addition to the starting and ending of the excitation operation as in the conventional camera.

When the vibration mode is applied, a vibration mode is preferentially applied in which the dust removing operation is effectively performed immediately before the photographing.

In the present embodiment, according to the above-described carrying out, the direction in which the dust is removed or the force which acts on the dust changes depending on a posture (gravity direction and dustproof filter surface direction) of the camera, but the dust removing operation is securely notified to the user. Consequently, the dust removal in an optimum camera posture is possible, and it is possible to obtain an effect that an efficiency of the dust removal is improved. It is possible to prevent an action of moving the camera during the dust removing operation to thereby reduce a dust removing effect. When the excitation operation is effectively carried out, an excitation operation time needs to be lengthened. Even in this case, since an excitation operating situation is notified to the user, it is possible to eliminate user's uncertainty as to a time when the excitation operation ends.

It is to be noted that in the above-described embodiment, the dust removing operation is displayed by eight segment groups of the shutter speed pattern 58f and the pattern 58g indicating the number of the images that can be photographed, but it is possible to superimpose the image of the dust on a background image and display the removal operation state.

FIGS. 19A to 19F are diagrams showing examples to display states of the dust removing operation using the liquid crystal monitor 36 for photographed image display.

Figure 19A:
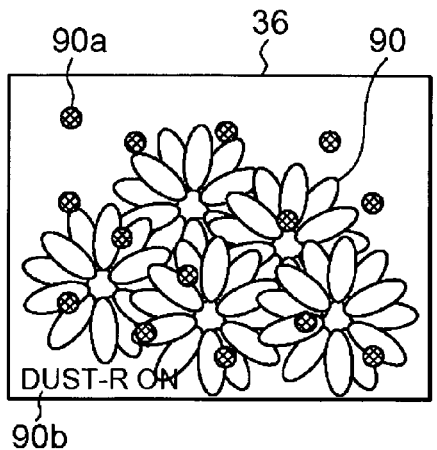
FIGS. 19A to 19F are diagrams showing examples to display states of a dust removing operation using a liquid crystal monitor for photographed image display.
Figure 19B:
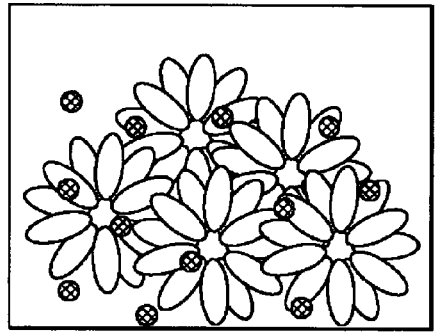
Figure 19C:
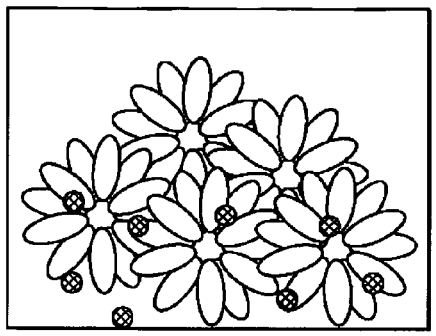
Figure 19D:
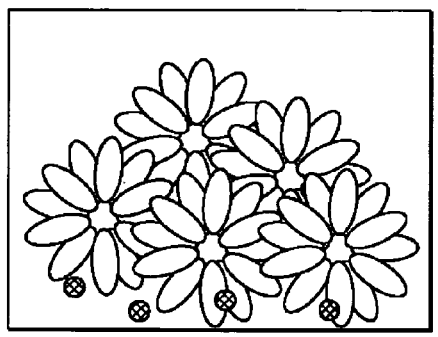
Figure 19E:
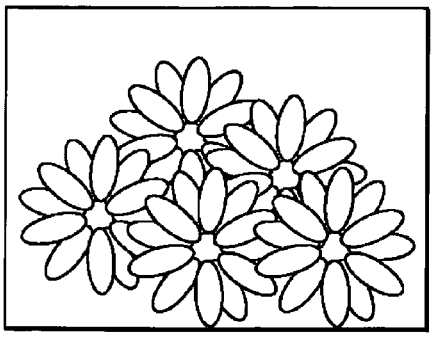
Figure 19F:
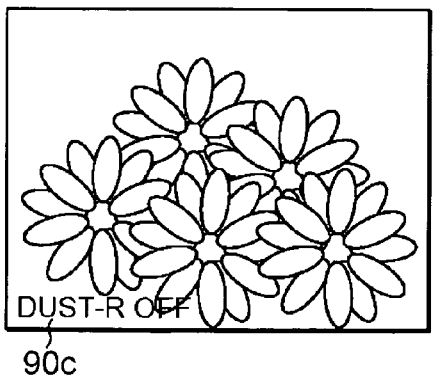

In mode display, as shown in FIG. 19A, an image 90a of dust and an excitation mode display 90b indicating an operation mode of dust removing means are superimposed on a background image (flower in this case) 90, and displayed in the liquid crystal monitor 36. Moreover, the timing adjusted into the start of the excitation operation, the image 90a of the dust is moved by a predetermined amount downwards in a screen, and the images are successively displayed as the excitation operation display shown in FIGS. 19B, 19C, 19D. As shown in FIG. 19E, the image of the dust is deleted, and the background image 90 only is displayed immediately before the end of the excitation operation. To be synchronized with the end of the excitation operation, as shown in FIG. 19F, an excitation end display 90c is superimposed on the background image 90 and displayed as shown in FIG. 19F.

It is to be noted that the display of the dust image described here is switched in a timing similar to that of the flowchart shown in FIG. 15. As to the displayed background image, the subject image is displayed in a liquid crystal monitor in real time. The subject image is used in the camera having an electronic finder in which the liquid crystal monitor is used as the finder. In the camera which does not have any electronic finder, the last photographed frame is used as the background image, or an image stored beforehand in a camera storage region is used as the background image.

Moreover, since a technology of superimposing the above-described dust image on the background image is well known, description thereof is omitted.

Furthermore, a visible display may be performed in accordance with an excitation operating time. For example, an LED 60 (see FIGS. 1, 2) may be disposed in the outside of the camera, so that confirmation can be made by a lit or blinking display for a time for which the excitation operation is performed.

The above-described embodiment may be modified as follows. For example, in addition to dust removing means by excitation means, there may be used a system to remove dust of a dustproof filter by an air flow, or a system to remove the dust of the dustproof filter by a wiper. In this case, an excitation operation corresponds to an operation of jetting the air flow, or an operation of the wiper.

Moreover, in the above-described embodiment, display is made in an LCD for camera operation display, but the display may be, needless to say, made in a display device for displaying a photographed image.

Furthermore, an object to be excited is not limited to the described dustproof filter 21, and there may be used a member and the like (e.g., cover glass, half mirror, etc.) which are disposed in an optical path and which have light transmitting properties. Additionally, it is assumed that the member vibrates off the dust attached to the surface by vibration, and issues an acoustic wave in an audio region by the vibration and resonance. A excitation, a driving time and the like relating to the vibration are set to values depending on the members.

It is to be noted that an electronic imaging device to which the present invention is applied is not limited to the illustrated electronic camera (digital camera), and there may be used a device which requires a dust removing function and a sounding function, and the device may be put into practical use by modification if necessary.

Additionally, various modifications are possible in a range that does not depart from the scope of the present invention.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. An electronic imaging device comprising:
   an imaging element for converting an optical image of a subject into an electric signal;
   an imaging optical system which guides a subject light flux onto a photoelectric conversion surface of the imaging element;

a dustproof filter disposed in front of the photoelectric conversion surface of the imaging element;

an excitation mechanism which vibrates the dustproof filter;

an electronic circuit which supplies to the excitation mechanism a frequency signal for vibrating the dustproof filter; and a display section which displays that the excitation mechanism is operating, wherein the display section performs the display for a time longer than an operation time of the excitation mechanism.

2. The electronic imaging device according to claim 1, wherein the display section continues the display while the excitation mechanism is operating.

3. The electronic imaging device according to claim 2, wherein the display section is a light emitting element.

4. The electronic imaging device according to claim 1, wherein the display section displays a first state a predetermined time before the operation of the excitation mechanism starts, and displays a second state which is different from the first state during the operation of the excitation mechanism.

5. The electronic imaging device according to claim 4, wherein the display section displays the second state for a time longer than that of the operation of the excitation mechanism.

6. The electronic imaging device according to claim 1, wherein the display section displays a first state a predetermined time before the operation of the excitation mechanism starts, displays a second state which is different from the first state during the operation of the excitation mechanism, and displays a third state which is different from the first and second states from a time when the excitation mechanism stops until a predetermined time elapses.

7. The electronic imaging device according to claim 1, wherein the display section displays an image obtained by superimposing images of dust on a background image, and the dust images move toward outside of the background image during the operation of the excitation mechanism.

8. The electronic imaging device according to claim 1, wherein the display section displays an image obtained by superimposing images of dust on a background image, successively brings the dust images into a non-display state during the operation of the excitation mechanism, and brings all the dust images into the non-display state at a time when the operation of the excitation mechanism ends.

9. The electronic imaging device according to claim 1, wherein the display section is also used as display means for displaying a state of the electronic imaging device.

10. The electronic imaging device according to claim 1, wherein the display of the display section changes with progress of the operation of the excitation mechanism.

11. An electronic imaging device comprising:
an imaging element for converting an optical image of a subject into an electric signal;
a dustproof filter disposed in front of a photoelectric conversion surface of the imaging element;
a dust and dirt removing mechanism which removes dust and dirt on the dustproof filter;
a control section which operates the dust and dirt removing mechanism for a predetermined time; and
a display section which displays that a dust and dirt removing operation is being performed in accordance with an operation of the dust and dirt removing mechanism,
wherein the display section performs the display for a time longer than an operation time of the dust and dirt removing mechanism.

12. The electronic imaging device according to claim 11, wherein the display section is also used as a display section for displaying a state of the electronic imaging device.

13. The electronic imaging device according to claim 11, wherein the display of the display section changes with elapse of a time of the operation of the dust and dirt removing mechanism.

14. An electronic imaging device comprising:
an imaging element for converting an optical image of a subject into an electric signal;
a dustproof filter disposed in front of a photoelectric conversion surface of the imaging element;
a piezoelectric element disposed in a peripheral edge portion of the dustproof filter;
a driving circuit which supplies a driving signal to the piezoelectric element;
a display circuit in which image display or state display is possible; and
a CPU which controls the driving circuit to execute a dust and dirt removing operation and which makes the display circuit to display that the dust and dirt removing operation is being executed in cooperation with the dust and dirt removing operation
wherein the time to display that the dust and dirt removing operation is being executed is longer than the time of the dust and dirt removing operation.

15. The electronic imaging device according to claim 14, wherein the display circuit includes a liquid crystal display element.

16. The electronic imaging device according to claim 14, wherein the display circuit includes a light emitting display element.

17. The electronic imaging device according to claim 16, wherein the light emitting display element is controlled in such a manner as to blink by the CPU during the dust and dirt removing operation.

* * * * *